United States Patent [19]
Park et al.

[11] Patent Number: 5,487,133
[45] Date of Patent: Jan. 23, 1996

[54] DISTANCE CALCULATING NEURAL NETWORK CLASSIFIER CHIP AND SYSTEM

[75] Inventors: Chin S. Park; Mark A. Holler, both of Palo Alto; Jay M. Diamond, San Jose; Siang-Chun The, Fremont, all of Calif.; Umberto Santoni, Scottsdale, Ariz.; Kenneth R. Buckmann, San Jose, Calif.

[73] Assignee: Intel Corporation, Santa Clara, Calif.

[21] Appl. No.: 86,514

[22] Filed: Jul. 1, 1993

[51] Int. Cl.$^6$ .............................. G06F 9/00; G06F 15/16
[52] U.S. Cl. .................................. 395/27; 395/22; 395/24
[58] Field of Search .................................. 395/27, 22, 24

[56] References Cited

U.S. PATENT DOCUMENTS

| | | | |
|---|---|---|---|
| 4,858,147 | 8/1989 | Conwell | 395/27 |
| 4,975,961 | 12/1990 | Sakoe | 395/22 |
| 5,040,230 | 8/1991 | Takatori et al. | 382/15 |
| 5,097,141 | 3/1992 | Leivian et al. | 395/21 |
| 5,194,864 | 3/1993 | Nakano | 395/22 |
| 5,208,872 | 5/1993 | Fisher | 382/42 |
| 5,239,594 | 8/1993 | Yoda | 395/24 |
| 5,255,346 | 10/1993 | Wu et al. | 395/27 |
| 5,276,771 | 1/1994 | Manukian et al. | 395/24 |
| 5,307,444 | 4/1994 | Tsuboka | 395/22 |
| 5,335,312 | 8/1994 | Mekata et al. | 395/2.11 |

*Primary Examiner*—George B. Davis
*Attorney, Agent, or Firm*—Blakely, Sokoloff, Taylor & Zafman

[57] ABSTRACT

An adaptive distance calculating neural network classifier chip accepts high dimensionality input pattern vectors with up to 256 5-bit elements per vector and compares the input vector with up to 1024 prototype vectors stored on-chip by calculating the distance between the input vector and each of the prototype vectors. The classifier further provides for identifying up to 64 classes to which the prototype vectors belong. If the distance between input and prototype vector is less than a programmable threshold distance, the prototype fires and the class to which it belongs is identified. If prototype vectors belonging to more than one class fire, a probabilistic model based on Parzen windows may be invoked to resolve the classification by providing the relative probabilities of various class membership. The classifier chip is trainable by supplying appropriate training vectors and associated class membership. Distance and probability parameters are generated during training and are stored for use in the classification mode. Incremental training is also provided so that additional prototypes may be added to an existing base. In order to extend the classifier capacity, multichip operation is provided under the supervision of a system administrator controller/CPU.

29 Claims, 27 Drawing Sheets

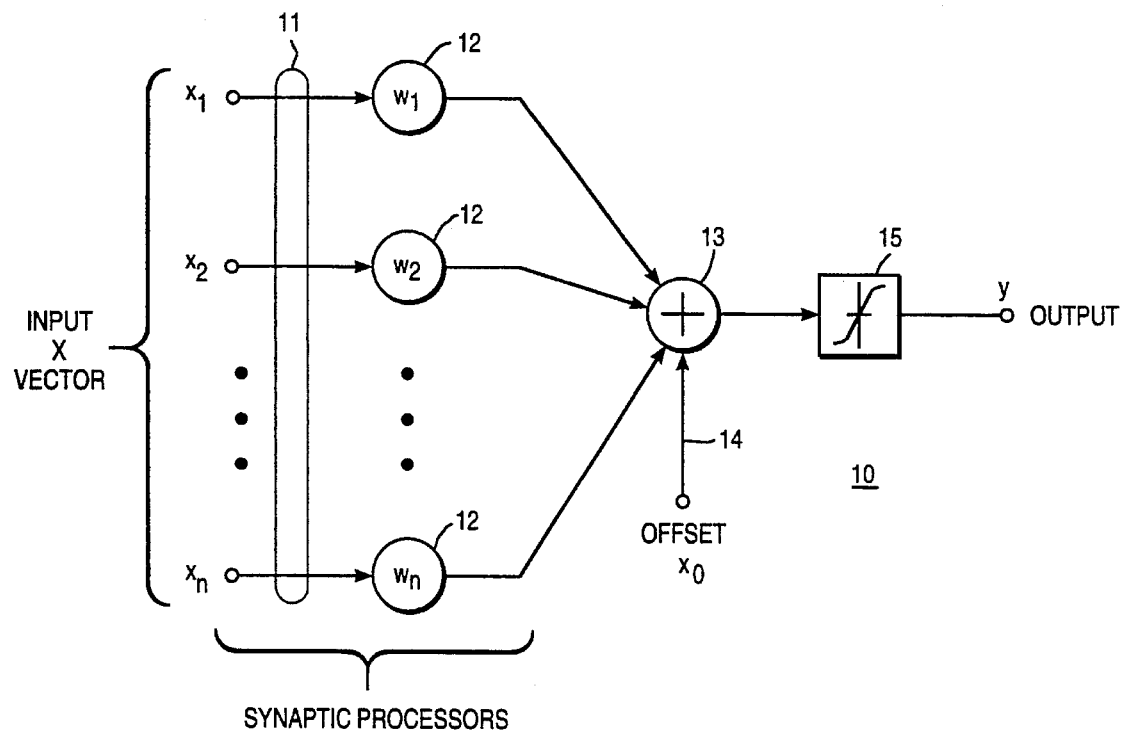
FIG_1 (PRIOR ART)
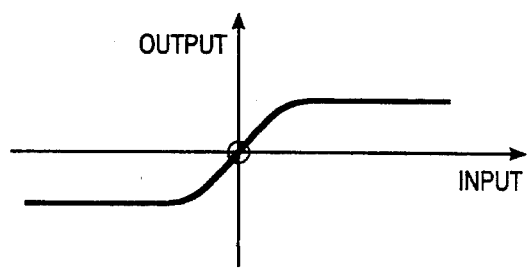
FIG_2(A)
(PRIOR ART)
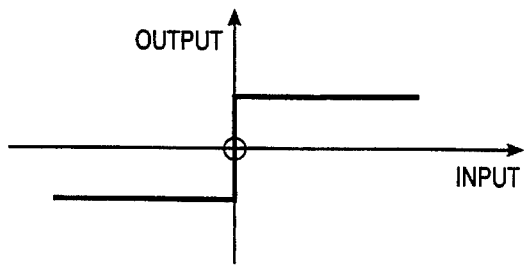
FIG_2(B)
(PRIOR ART)

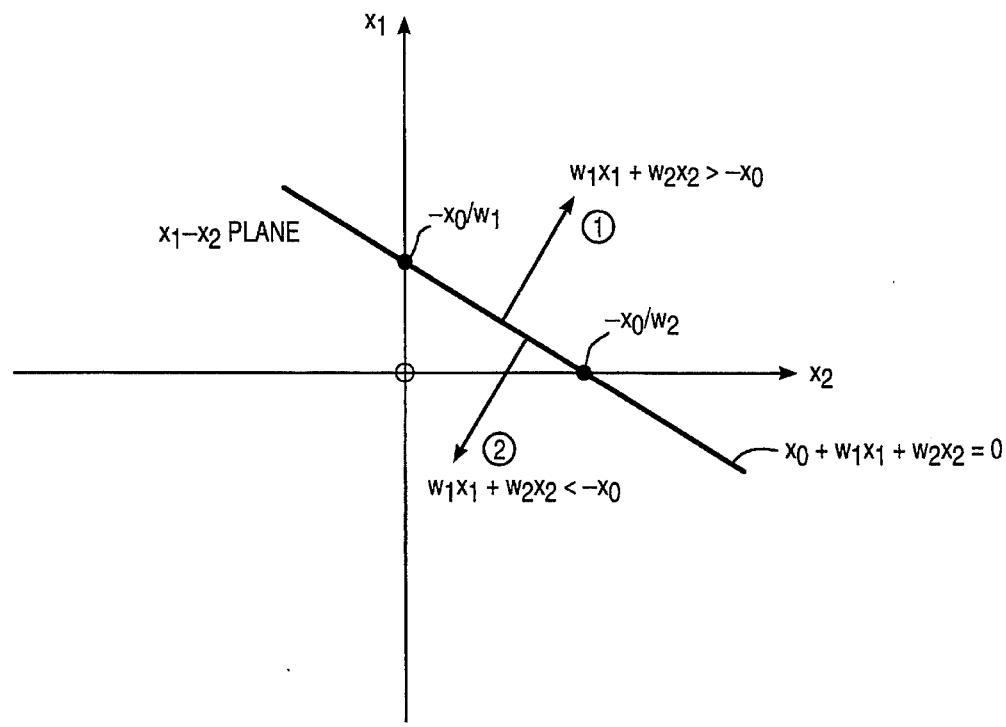
FIG_3 (PRIOR ART)
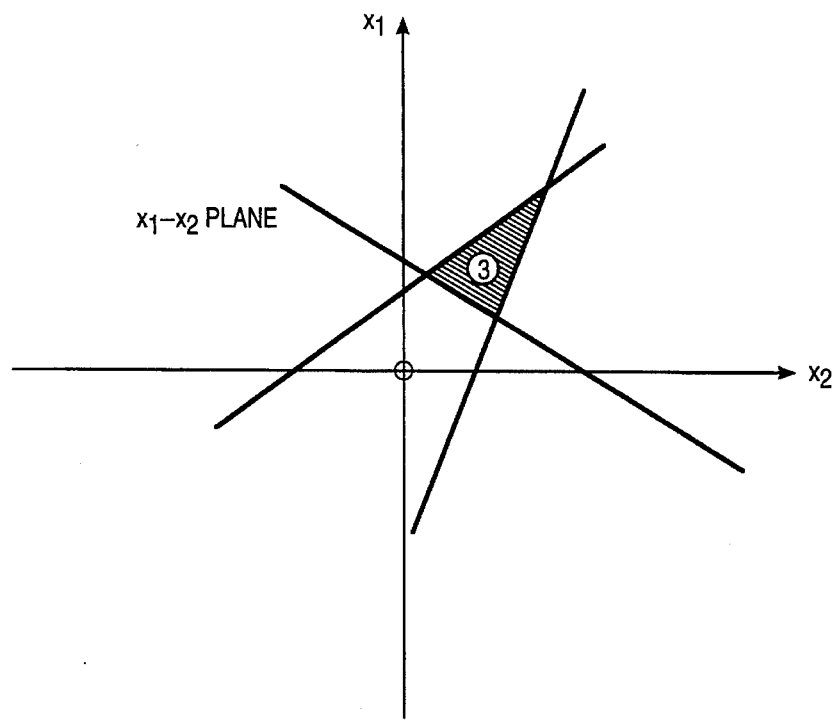
FIG_4 (PRIOR ART)

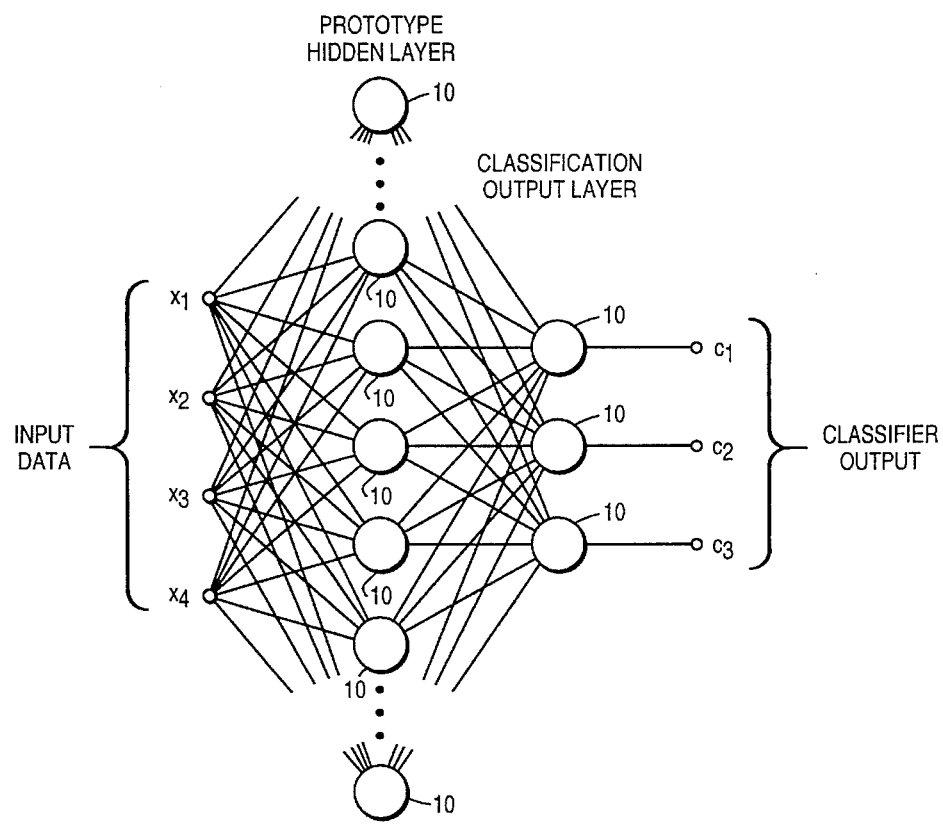
FIG_5 (PRIOR ART)
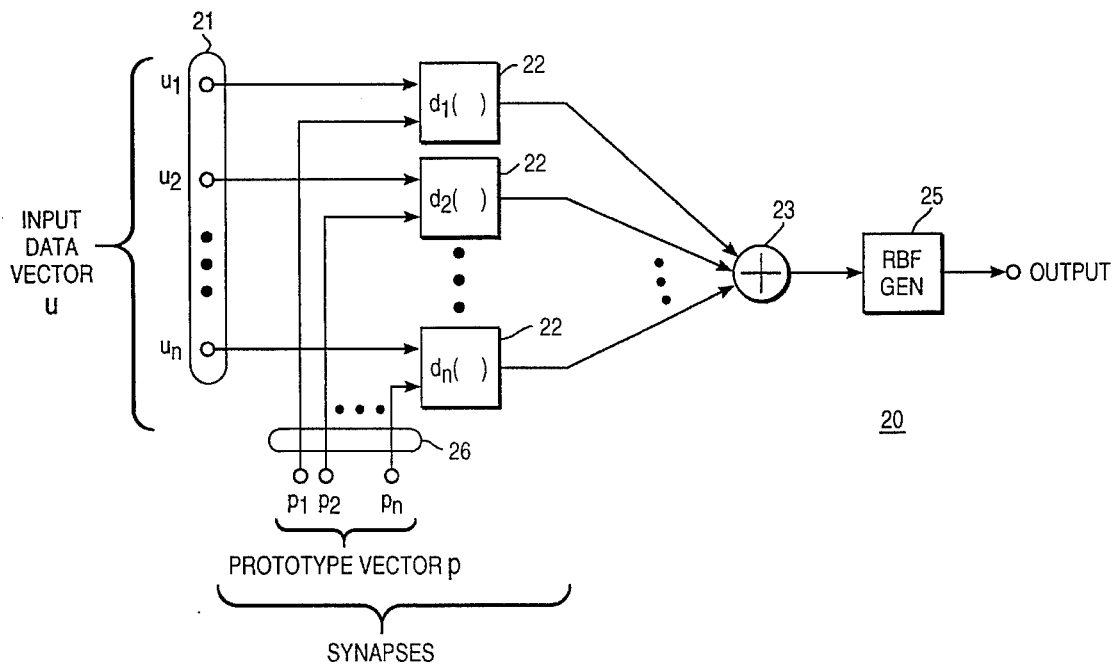
FIG_6 (PRIOR ART)

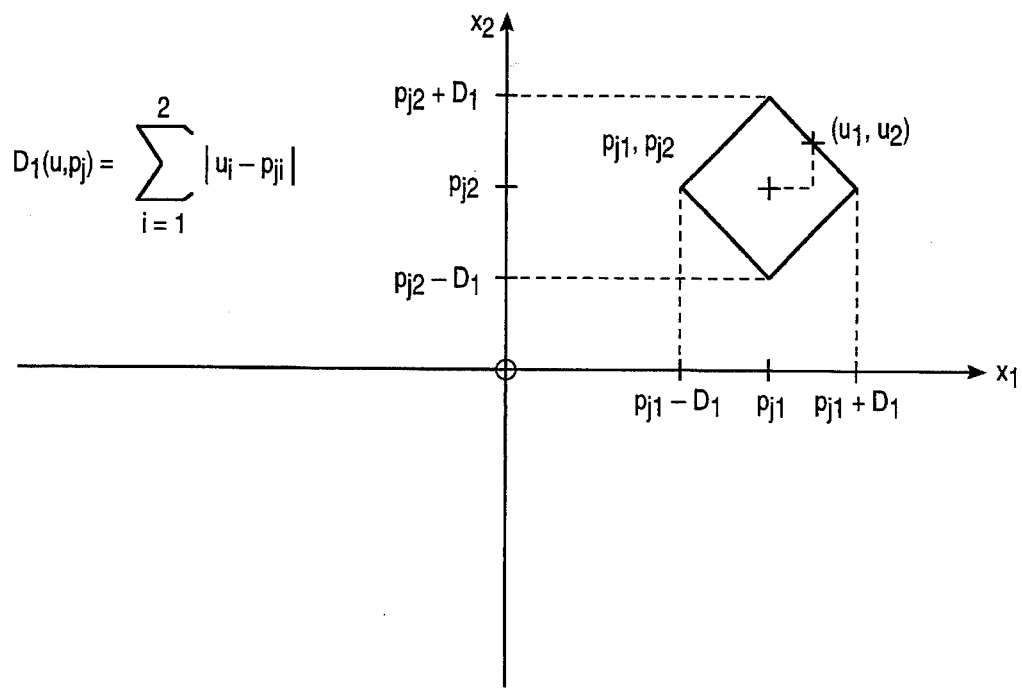
FIG_7 (A) (PRIOR ART)
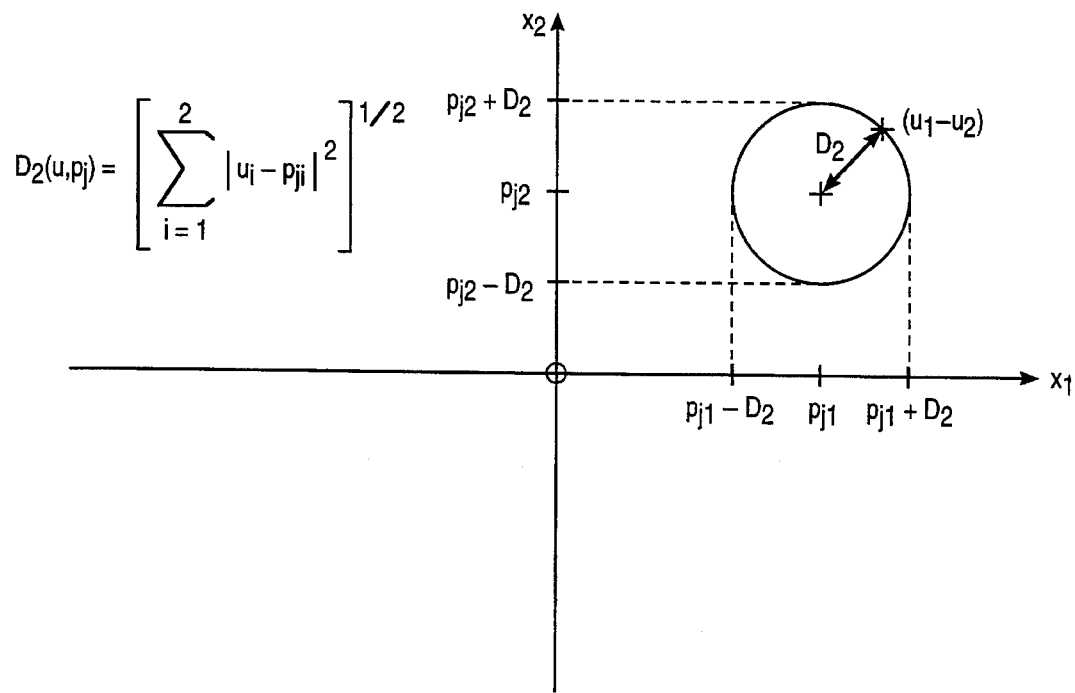
FIG_7 (B) (PRIOR ART)

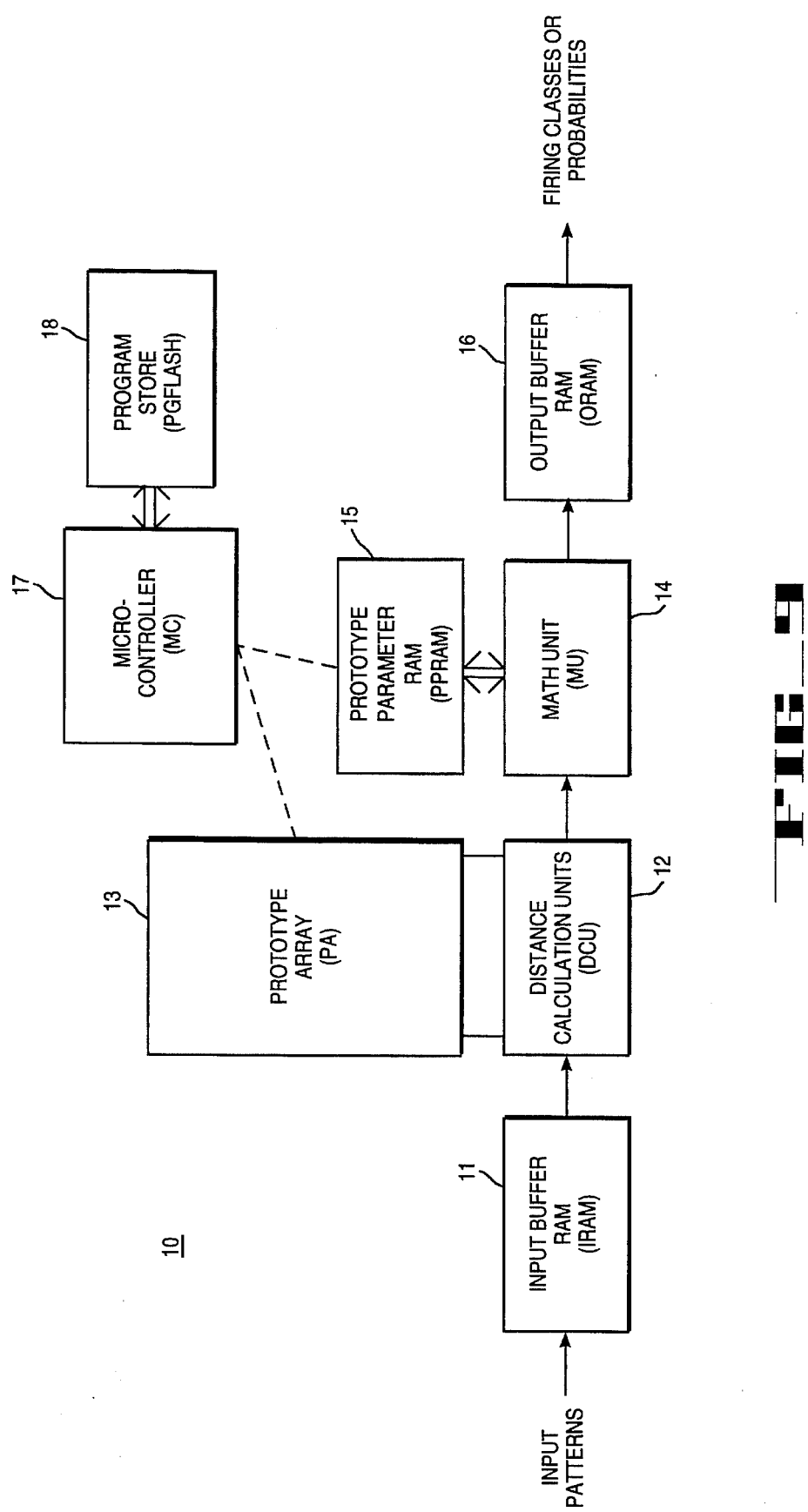
FIG_9

| MODE NAME | MODE CONTROL PINS ||||  DATA BUS |||||||| ADDRESS BUS |||
|---|---|---|---|---|---|---|---|---|---|---|---|---|---|---|---|
| | CS# | W/R# | MC# | TEST# | D[0:15] | CT | DF | D[16:31] | CT | DF | D[32:63] | CT | DF | A[1:15] | CT | DF |
| DISABLED | 1 | X | X | X | | | | | | | | | | | | |
| NORMAL WRITE | 0 | 1 | 1 | 1 | DIO[0:15] | b | — | DIO[16:31] | b | — | DIO[32:63] | b | — | AIO[0:5] | b | — |
| NORMAL READ | 0 | 0 | 1 | 1 | DIO[0:15] | b | O | DIO[16:31] | b | O | DIO[32:63] | b | O | AIO[0:5] | b | — |
| PGF-LOAD | 0 | 1 | 0 | 1 | PDBUS [0:15] | b | — | | X | U | | X | U | PABUS[0:15] | b | — |
| PGF-READ | 0 | 0 | 0 | 1 | PDBUS [0:15] | b | O | | X | U | | X | U | PABUS[0:15] | b | — |
| TEST (I) | 0 | 1 | 1 | 0 | DBUS[0:15] | b | — | CBUS[0:15] | b | ** | TBUS[0:31] ANALOG | d | ** | ABUS[0:15] | b | A |
| TEST (O) | 0 | 0 | 1 | 0 | DBUS[0:15] | b | O | CBUS[0:15] | b | **d | TBUS[0:31] ANALOG | d | **d | ABUS[0:15] | b | A |
| PGF-TEST | 0 | X | 0 | 0 | PDBUS[0:15] ANALOG | d | A | | X | U | | X | U | PABUS[0:15] | b | — |

FIG—10

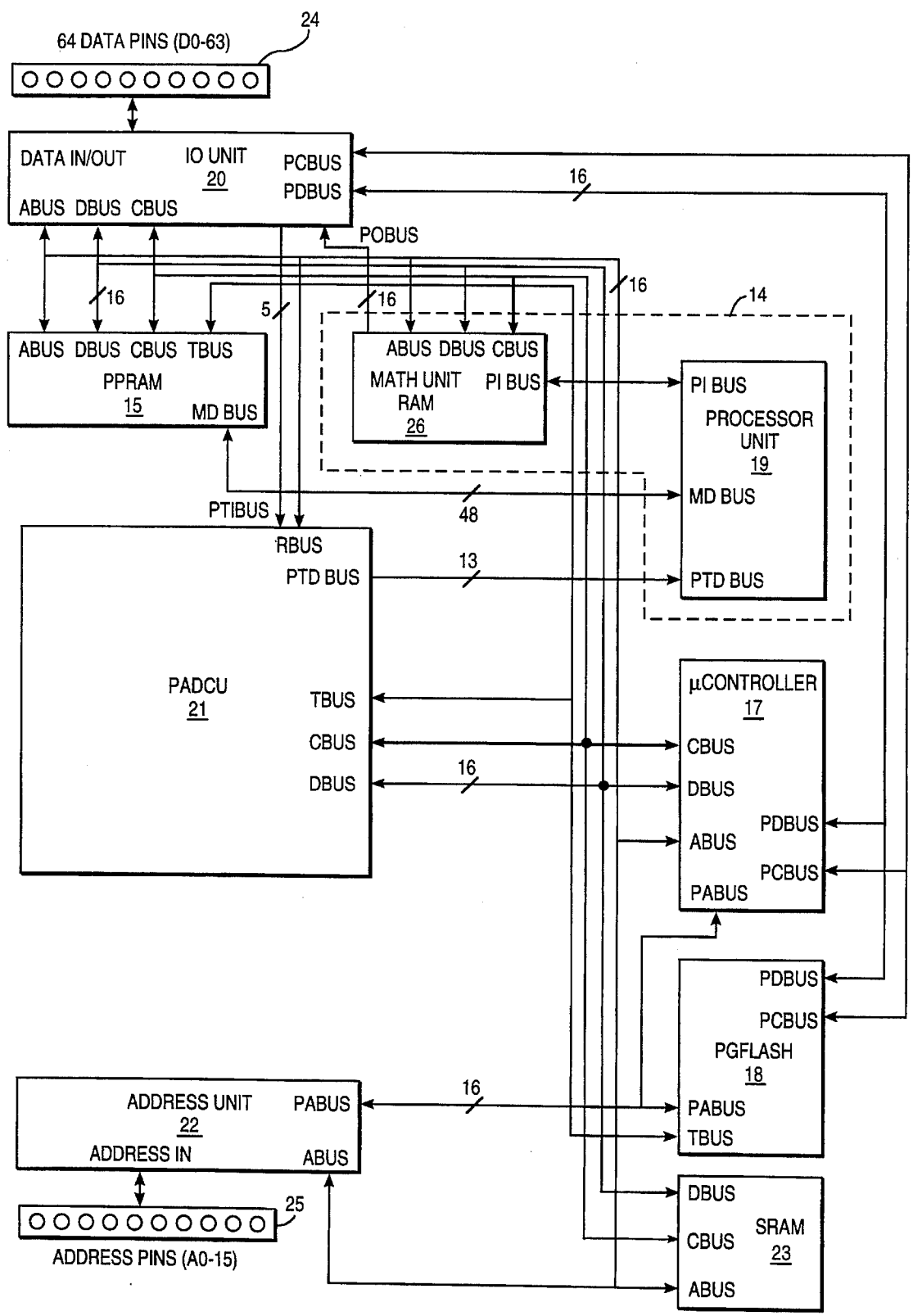
FIG_11

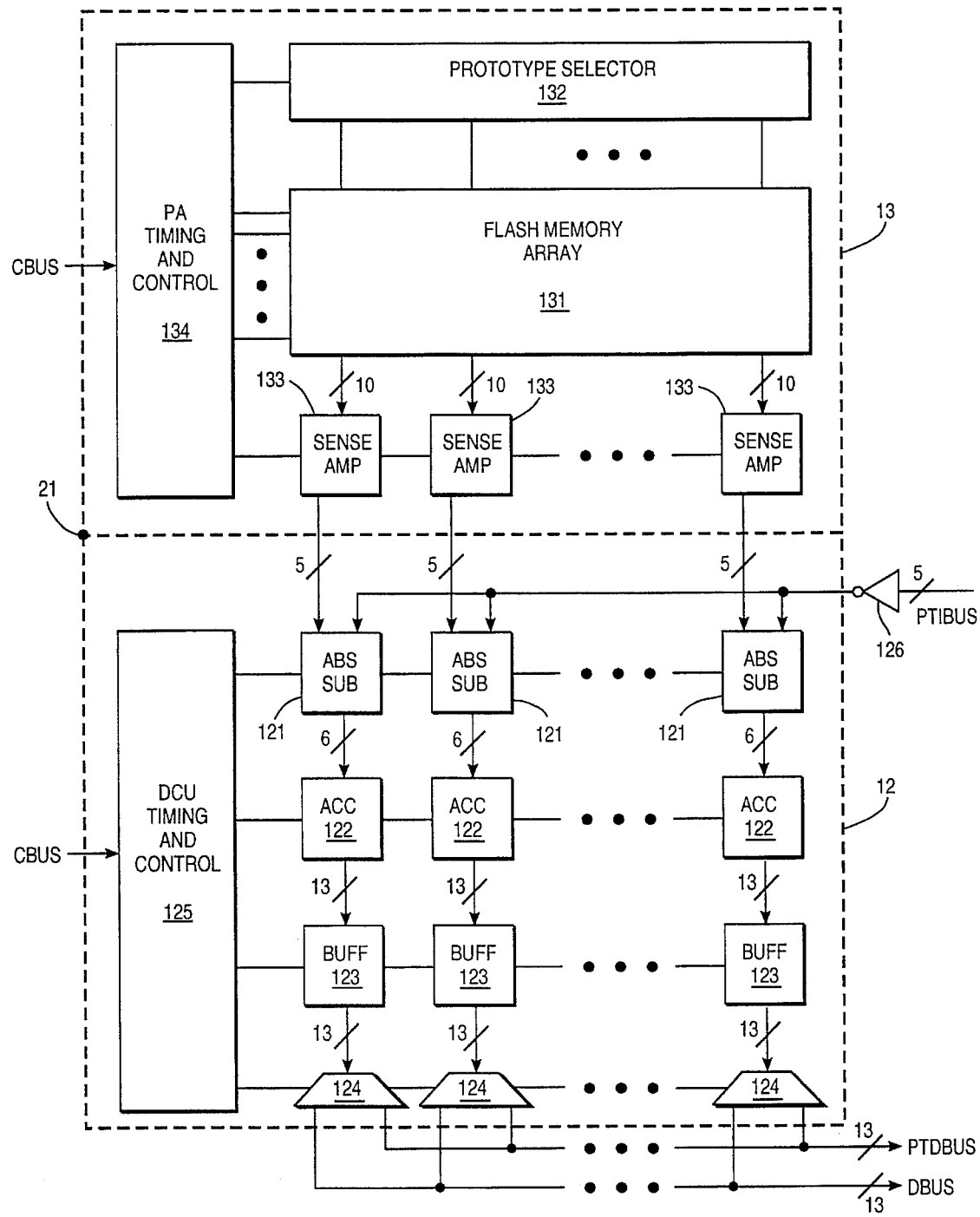
FIG_12

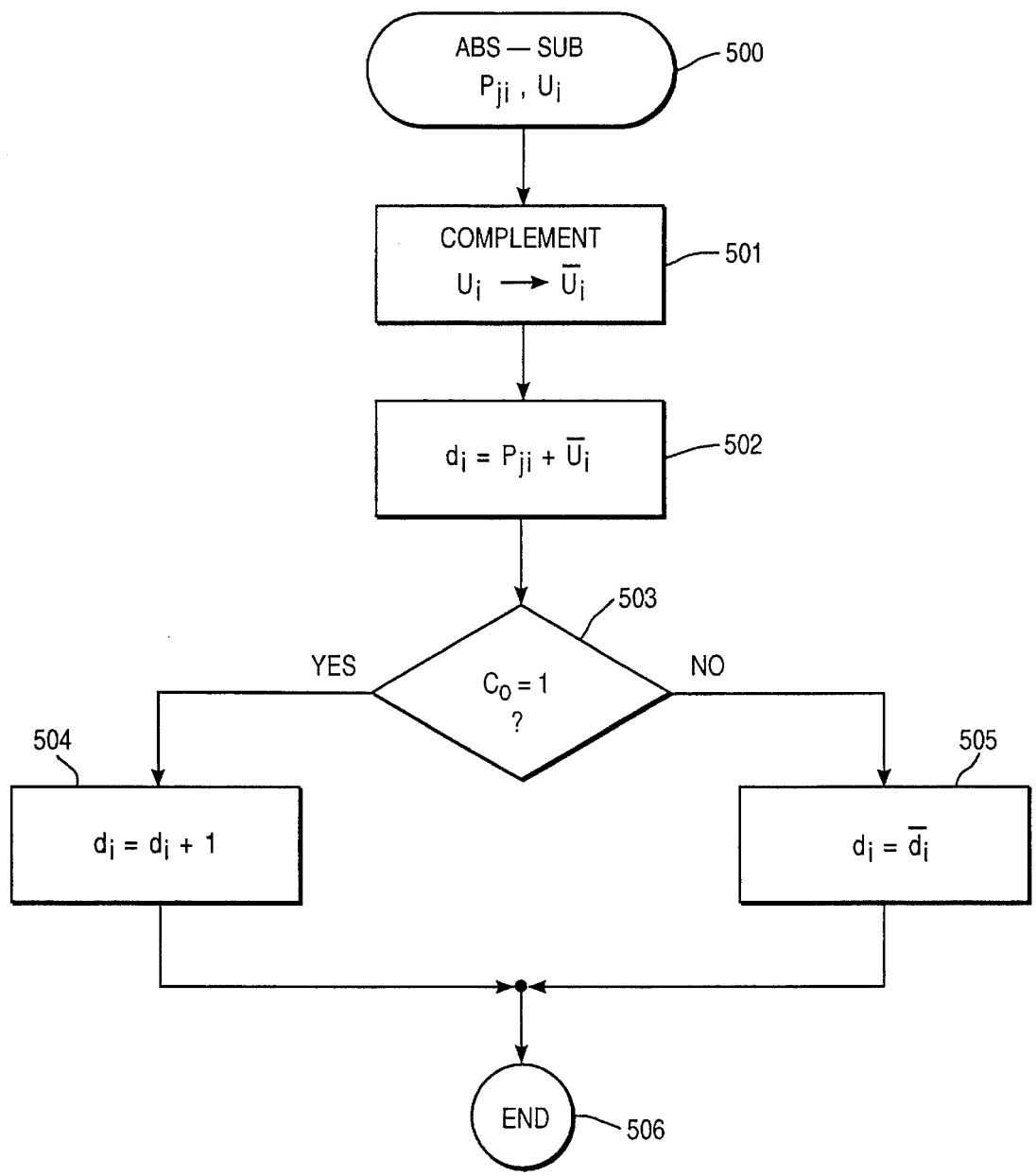
FIG_13

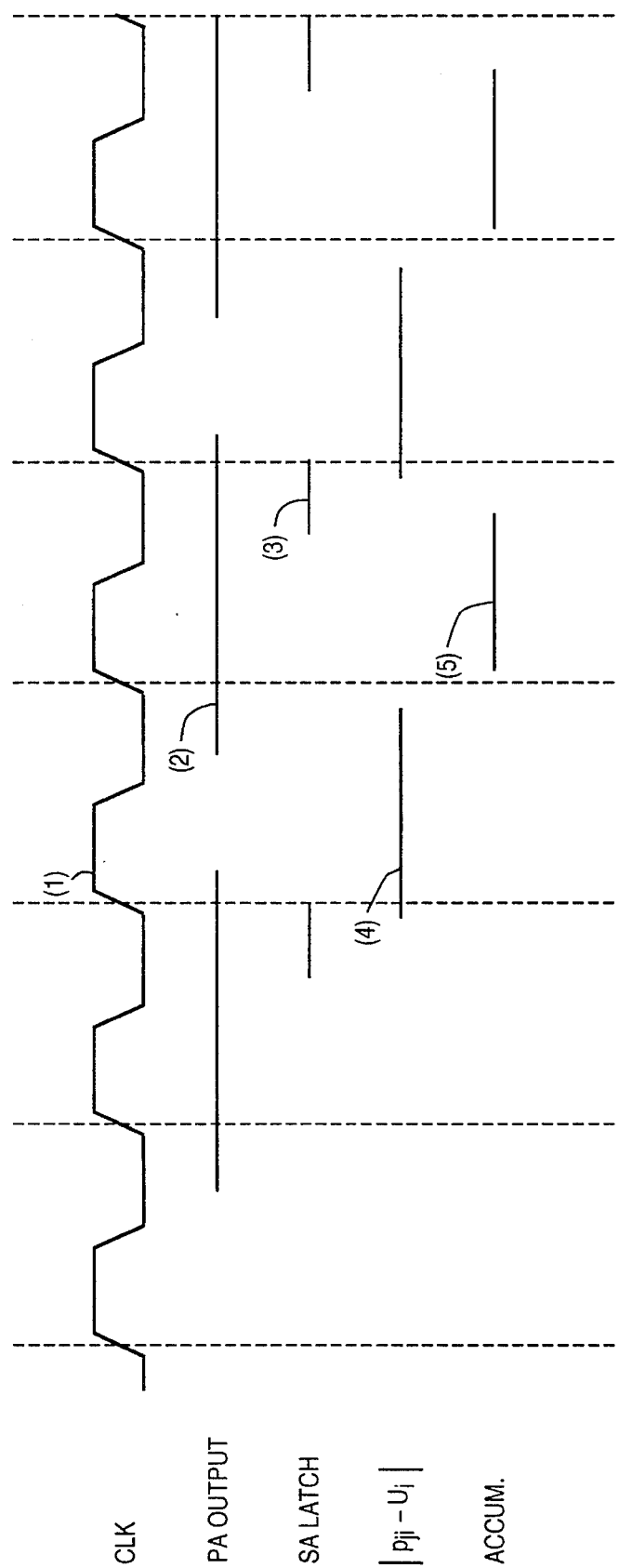
FIG_14

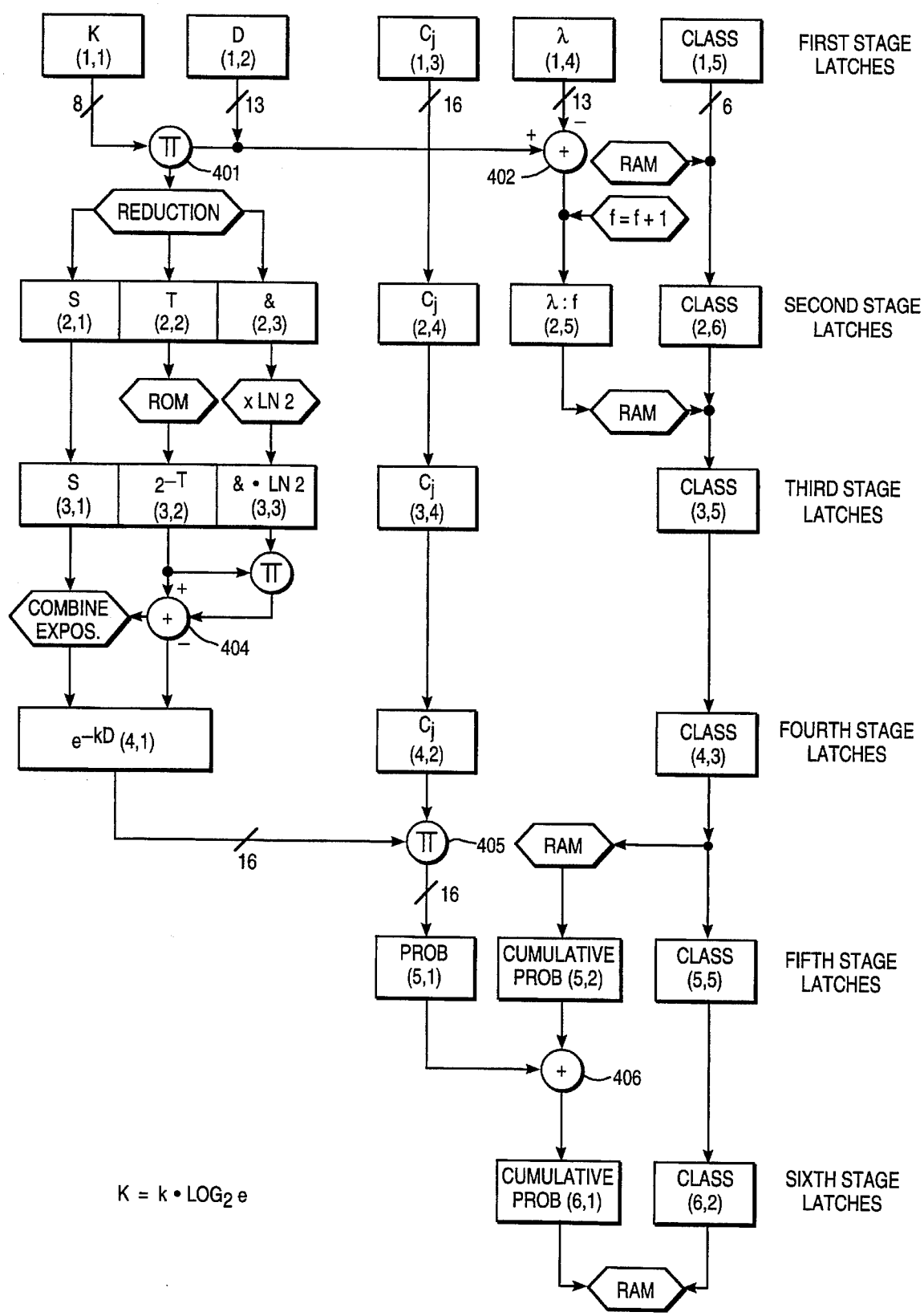
FIG_15

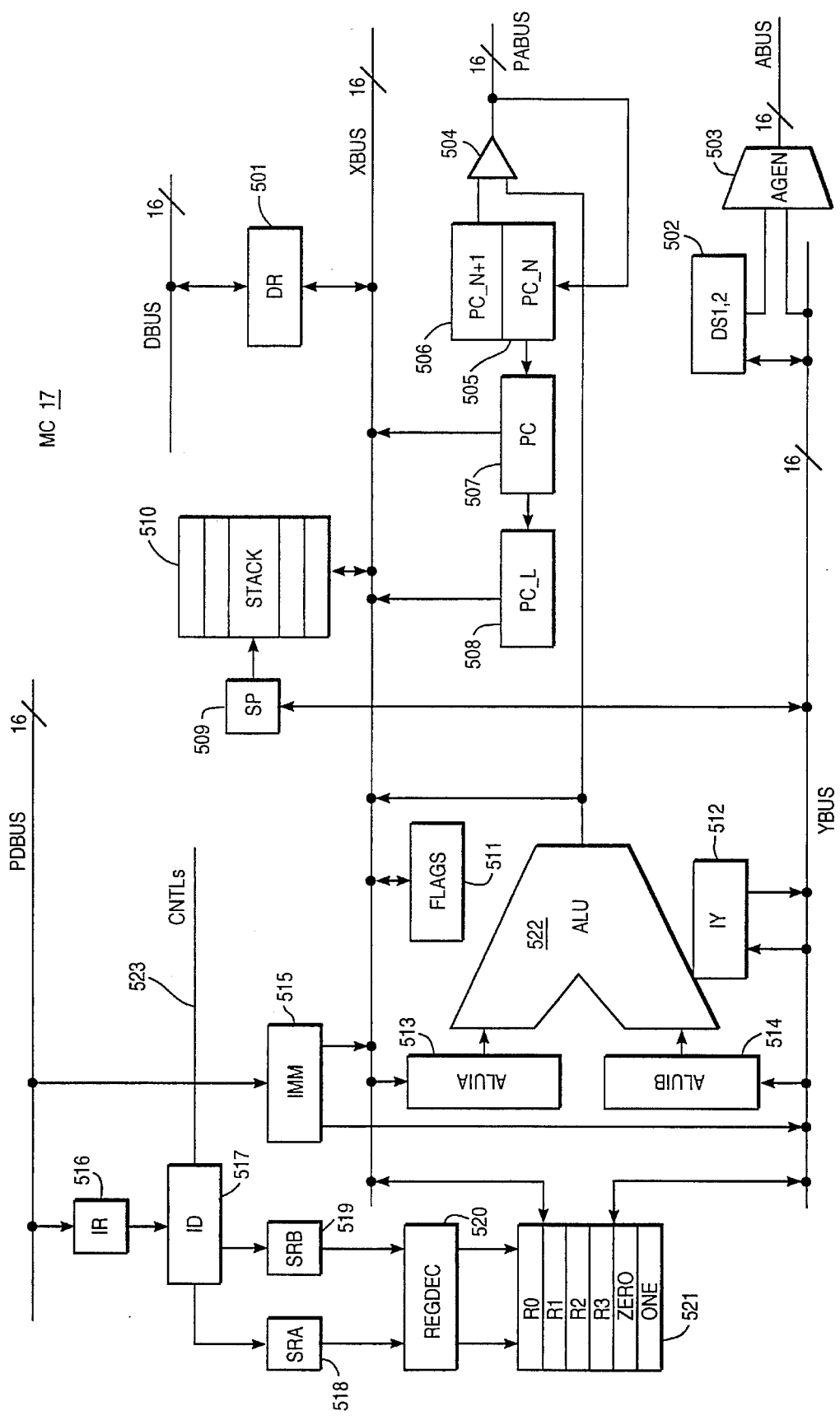
FIG_15

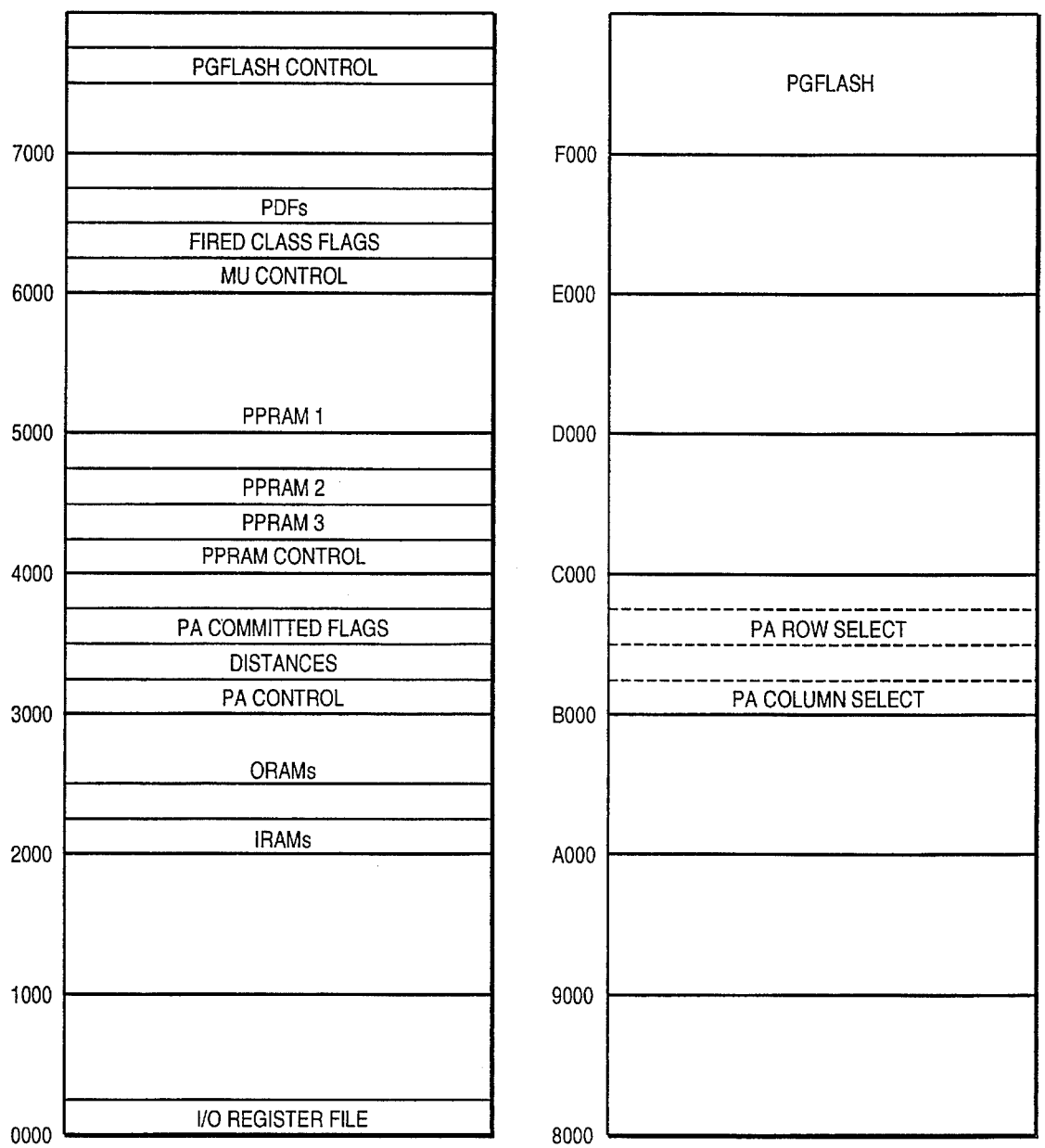
FIG_17

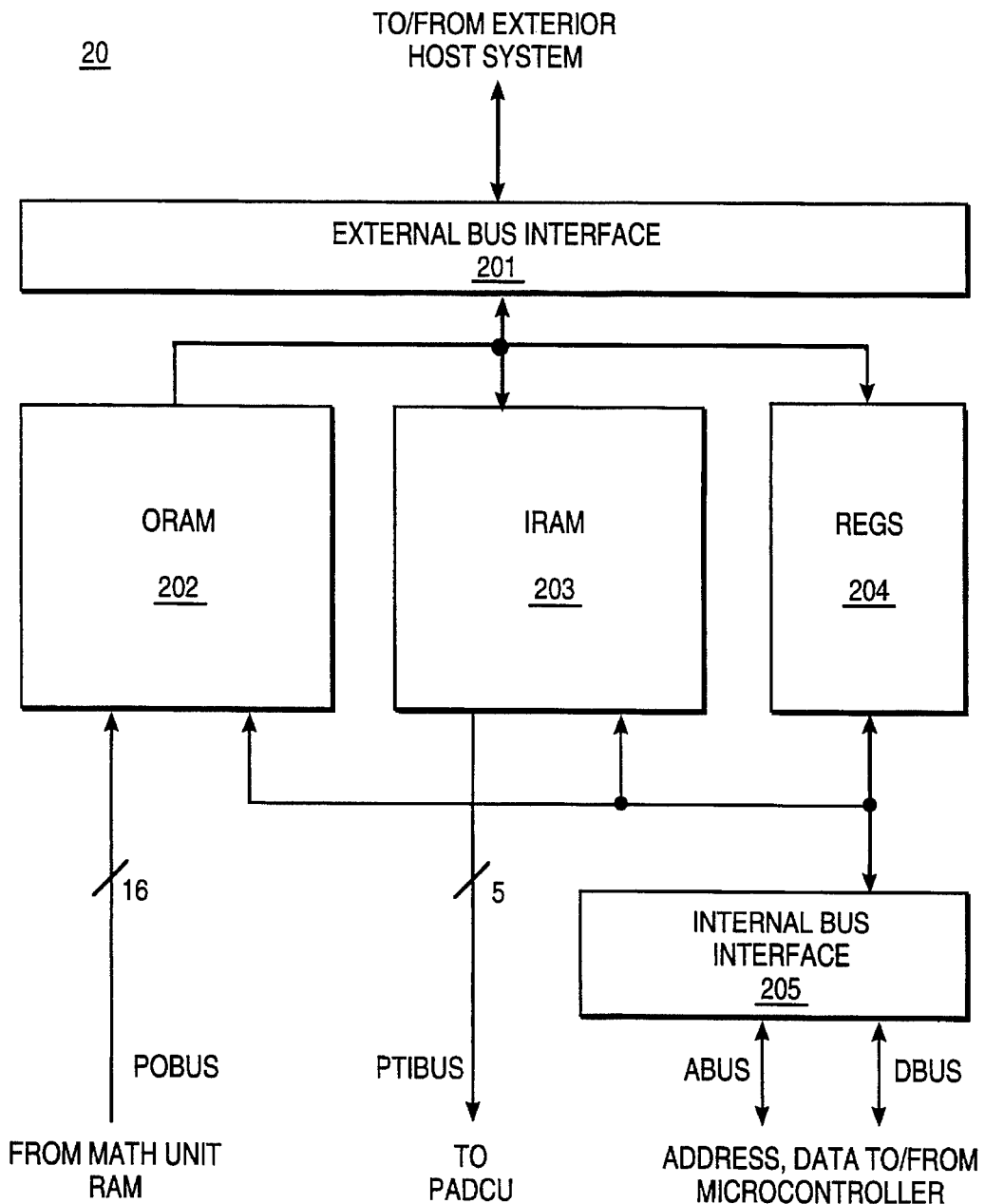
FIG_18

| \multicolumn{5}{|c|}{I/O REGISTER MAP} |
| --- | --- | --- | --- | --- |
| ADDRESS (HEX) | NAME | HOST R/W | MC17 R/W | EXPLANATION/NOTES |
| 0000 | CMR | r/w | r | CHIP MODE REGISTER: EXTERNAL WRITE CAUSES uC INTERRUPT #15. |
| 0008 | DIM | r/w | r/w | PROBLEM DIMENSIONS: UPPER BYTE = NUMBER OF DESIRED CLASSES FOR ORAM; LOWER BYTE = NUMBER OF DIMENSIONS IN INPUT VECTOR. |
| 0010 | IDR | r | r | CHIP ID REGISTER. HARDWIRED TO READ HEX 3159. |
| 0018 | SSR | r/w | r/w | SOIFTWARE STATUS: NO DIFFERENT FROM THE OP REGISTERS (SEE BELOW). |
| 0020 | HS1 | r | r | HARDWARE STATUS REGISTER 1: MONITORS MICRO-CONTROLLER STATUS FLAGS FROM CBUS. |
| 0028 | HS2 | r | r | HARDWARE STAUS REGISTER 2: MONITORS VARIOUS I/O UNIT AND CHIP STATUS. |
| 0030 | XIR | r | r/w | EXTERNAL INTERRUPT REGISTER: CONTAINS CODE TO IDENTIFY NATURE OF SRQ# REQUEST. |
| 0038 | IIR | r/w | r | INTERNAL INTERRUPT REGISTER: CONTAINS CODE TO IDENTIFY NATURE OF uC INTERRUPT. |
| 0040 | CRA | r/w | r/w | I/O CONTROL REGISTER A: CONTROL BITS FOR ORAM BEHAVIOR. |
| 0048 | CRB | r/w | r/w | I/O CONTROL REGISTER B: SETS OPERATING MODE OF IRAM, AND ORAM. |
| 0050 | OP0 | r/w | r/w | GENERAL-PURPOSE OPERAND REGISTER 0. |
| 0058 | OP1 | r/w | r/w | GENERAL PURPOSE OPERAND REGISTER 1. |
| 0060 | OP2 | r/w | r/w | GENERAL PURPOSE OPERAND REGISTER 2. |
| 0068 | OP3 | r/w | r/w | GENERAL PURPOSE OPERAND REGISTER 3. |
| 0070 | OP4 | r/w | r/w | GENERAL PURPOSE OPERAND REGISTER 4. |
| 0078 | OP5 | r/w | r/w | GENERAL PURPOSE OPERAND REGISTER 5. |

FIG_19

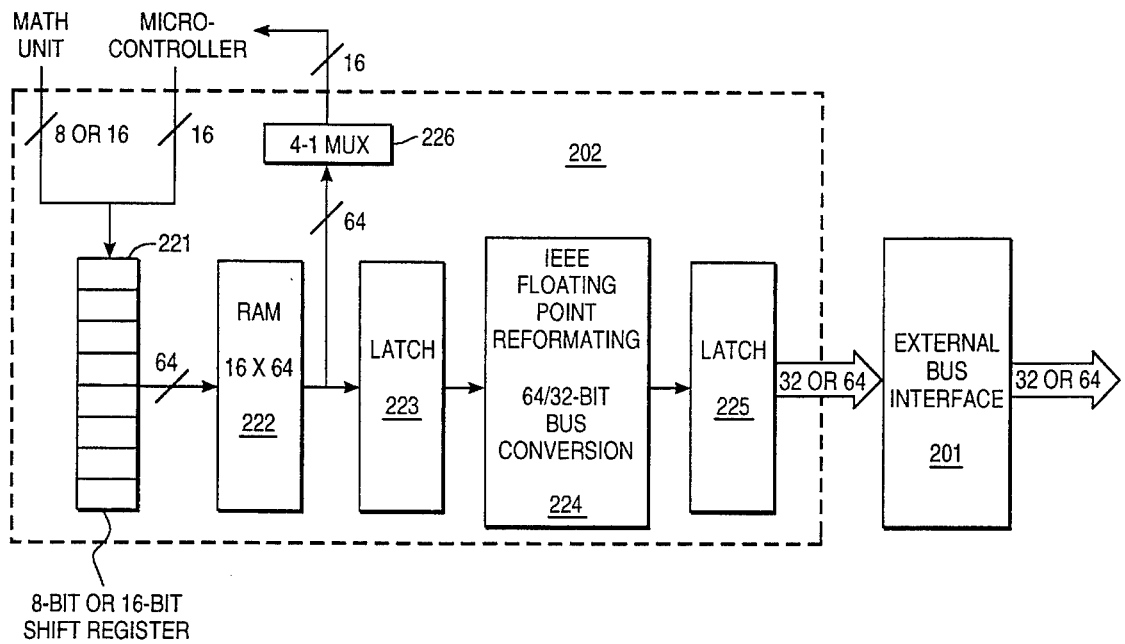
FIG_21
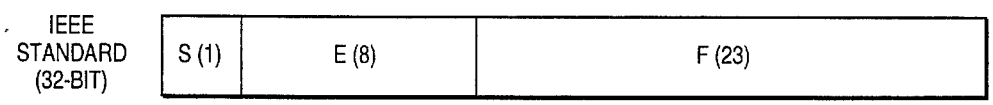
INTERPRETATION: $(-1)^S \times 2^{E-127} \times (1.F)$
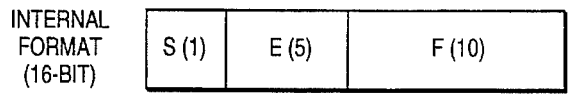
INTERPRETATION: $(0.F) \times 2^{\pm E}$
FIG_22

| | STARTING ADDRESS | ENDING ADDRESS | NUMBER OF ADDRESSES | RESOLUTION OF DATA |
|---|---|---|---|---|
| RAM1 READABLE ADDRESSES | 2000 | 20FF | 256 | 5 BIT |
| RAM2 READABLE ADDRESSES | 2100 | 21FF | 256 | 5 BIT |
| RAM1 LACHABLE (PRE-WRITE) ADDRESSES | 2000 | 20FF | 8 | 5 BIT (LSB's OF THE DBUS) |
| RAM1 WRITABLE ADDRESSES | 2400 | 24FF | 32 | 40 BITS (WRITTEN SIMULTANEOUSLY) |
| RAM2 LACHABLE (PRE-WRITE) ADDRESSES | 2100 | 21FF | 8 | 5 BIT (LSB's OF THE DBUS) |
| RAM2 WRITABLE ADDRESSES | 2500 | 25FF | 32 | 40 BITS (WRITTEN SIMULTANEOUSLY) |
| ORAM READABLE ADDRESSES | 2800 | 283F | 64 (ONE OF 4 WORDS IN 16 ROWS) | 16 BIT |
| ORAM LACHABLE (PRE-WRITE) ADDRESSES | 2800 | 283F | 1 (THE FIRST BLOCK IN THE SHIFT-REGISTER) | 8 OR 16 BITS (SELECTED WITH RCEB) |
| ORAM WRITABLE ADDRESSES | 2A00 | 2A3F | 16 (POSSIBLE ROWS OF RAM) | 64 BITS (WRITTEN SIMULTANEOUSLY) |

FIG_23

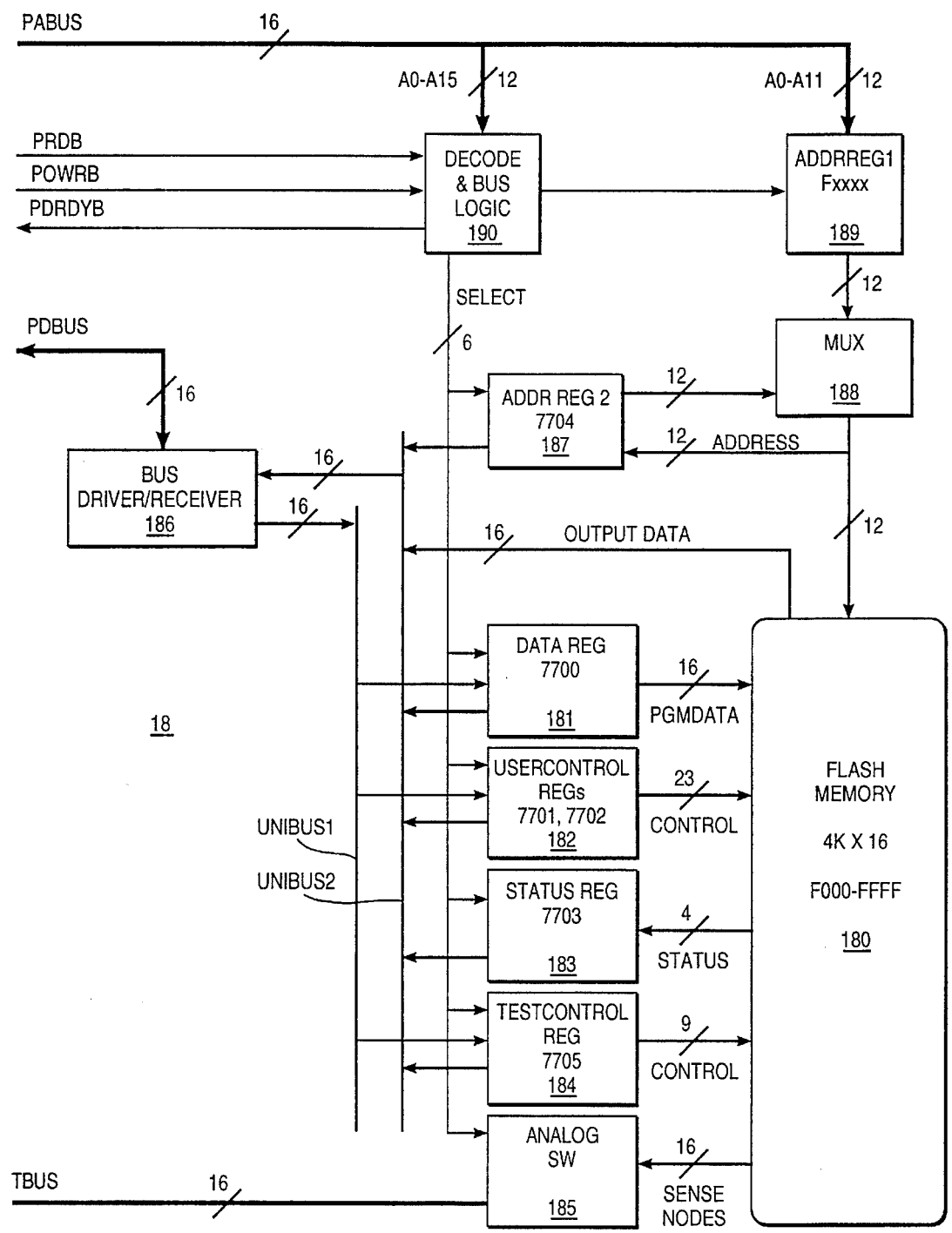
FIG_24

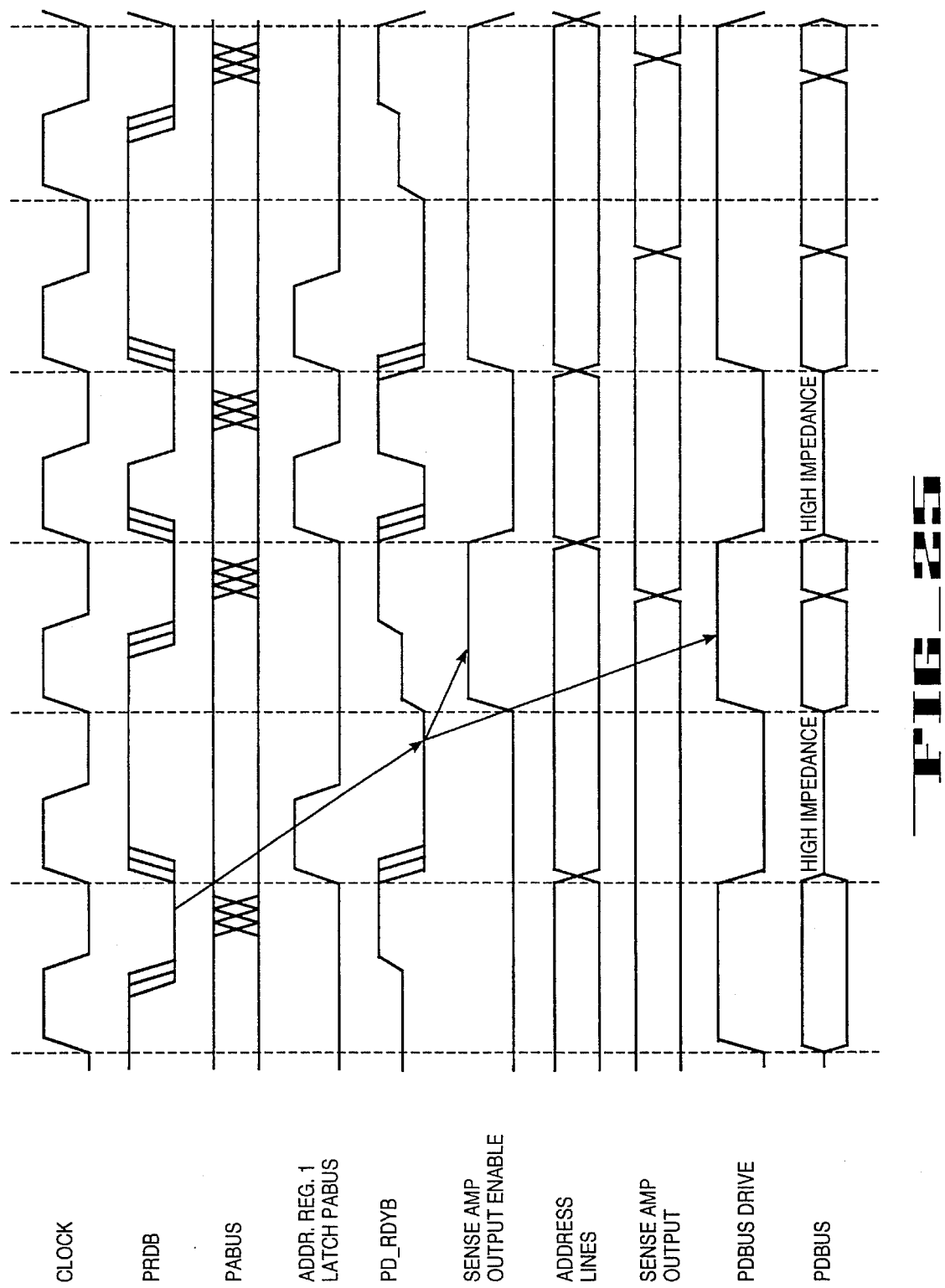
FIG_25

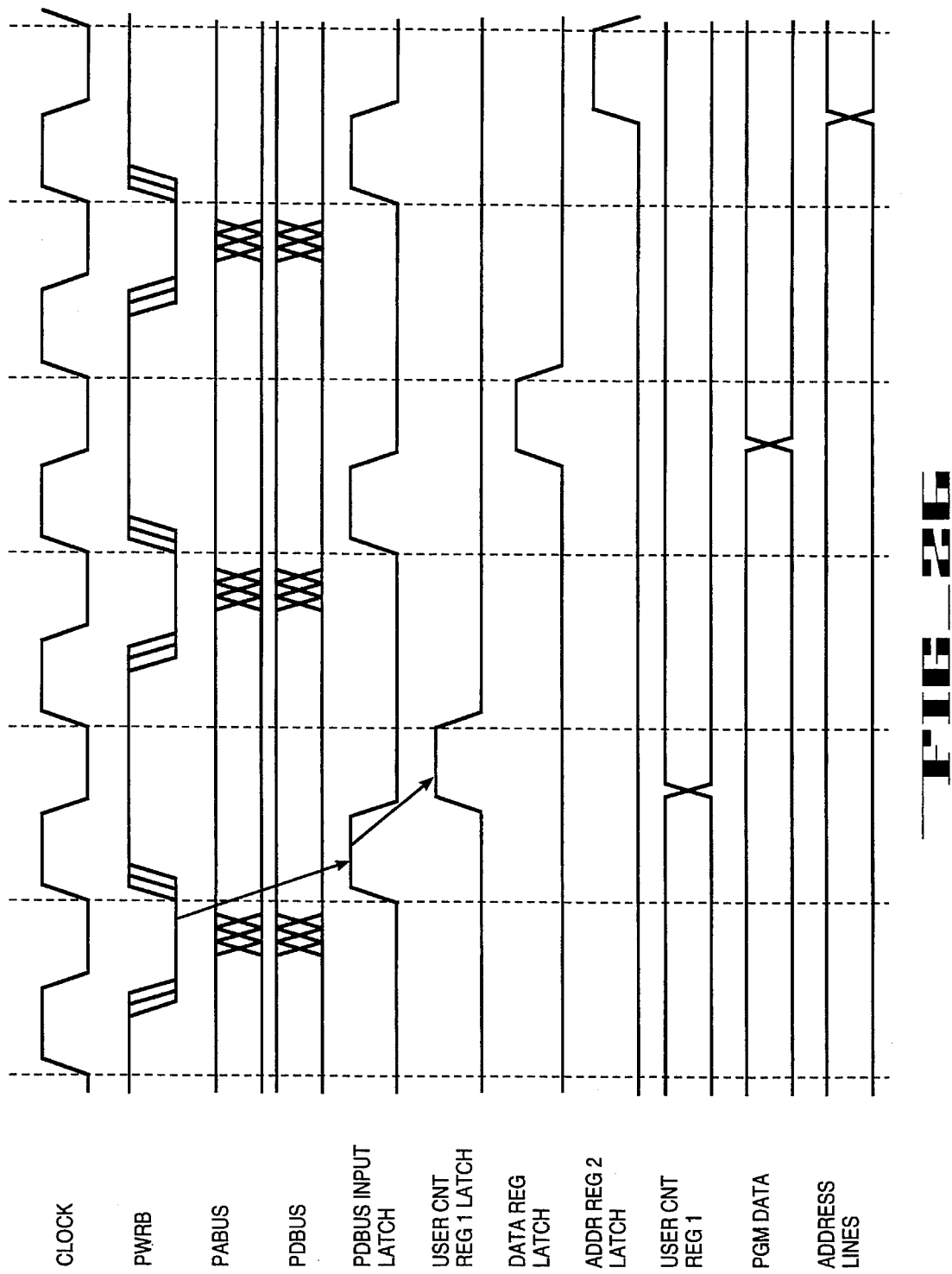
FIG_26

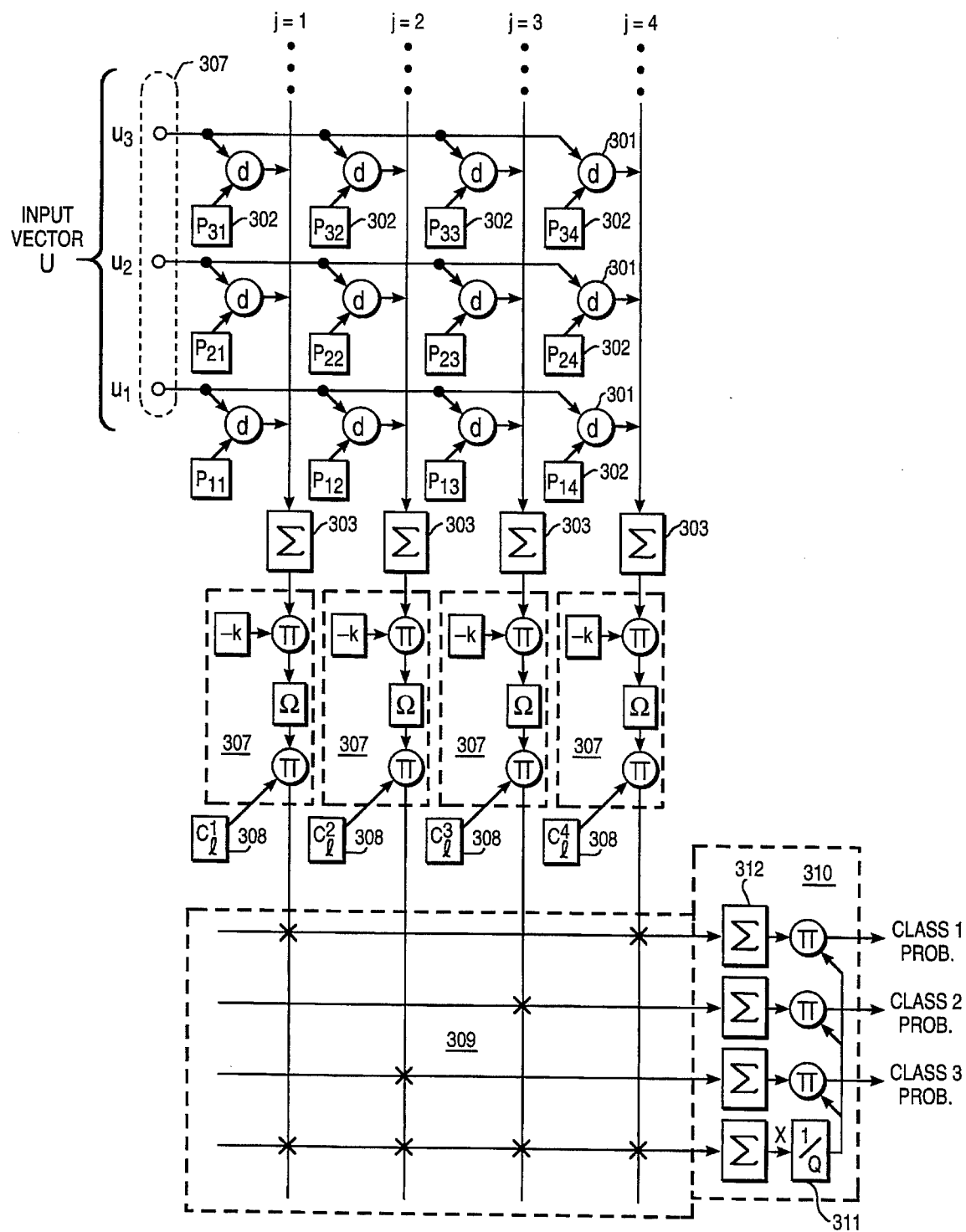
FIG_28

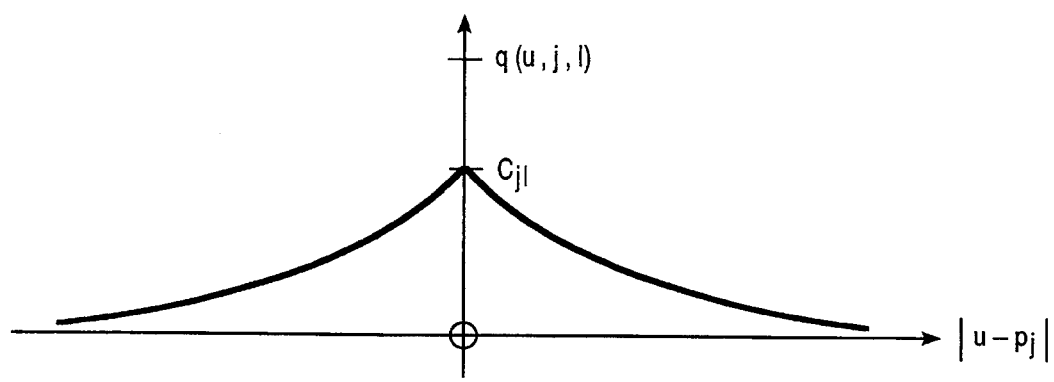
FIG_29
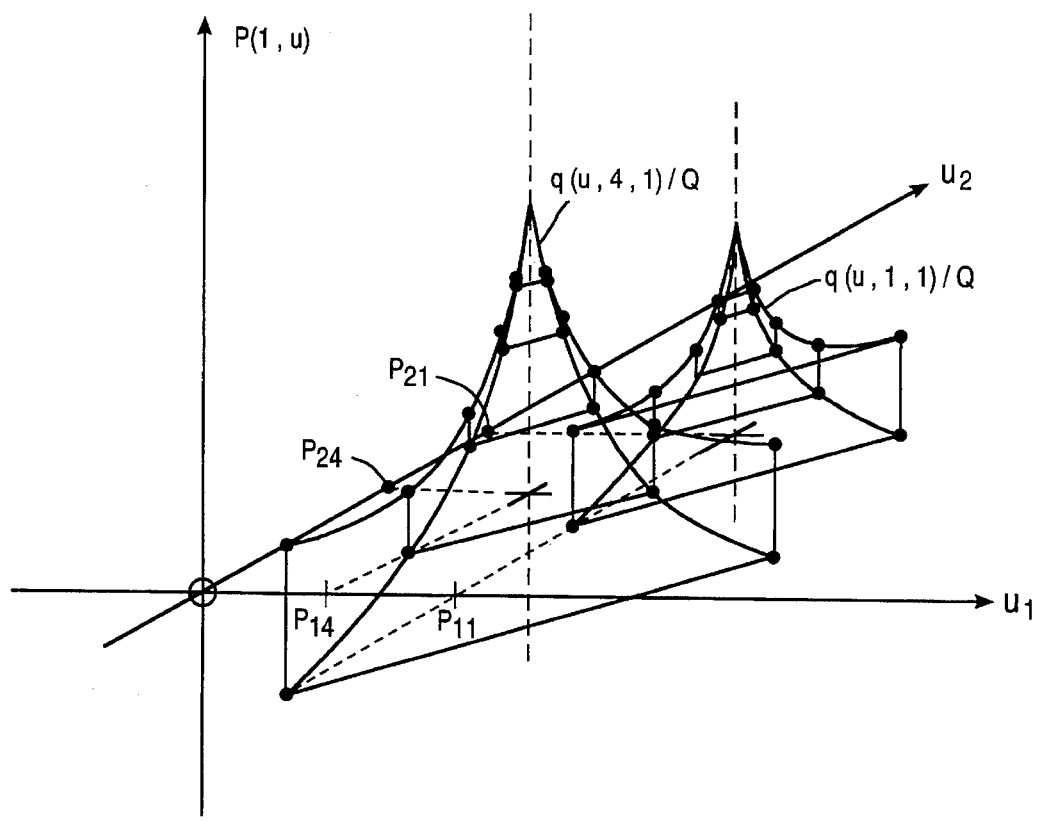
FIG_30

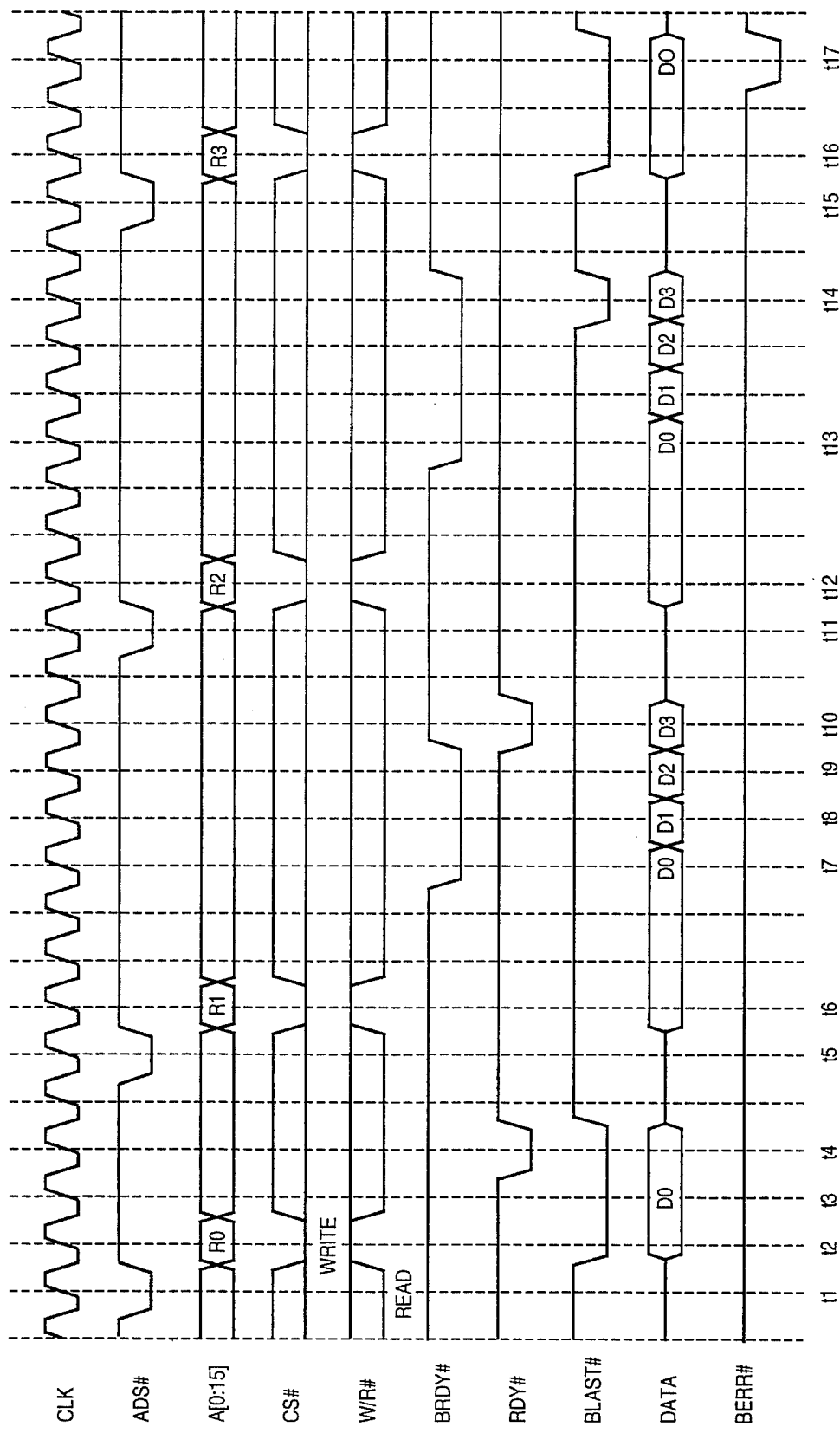

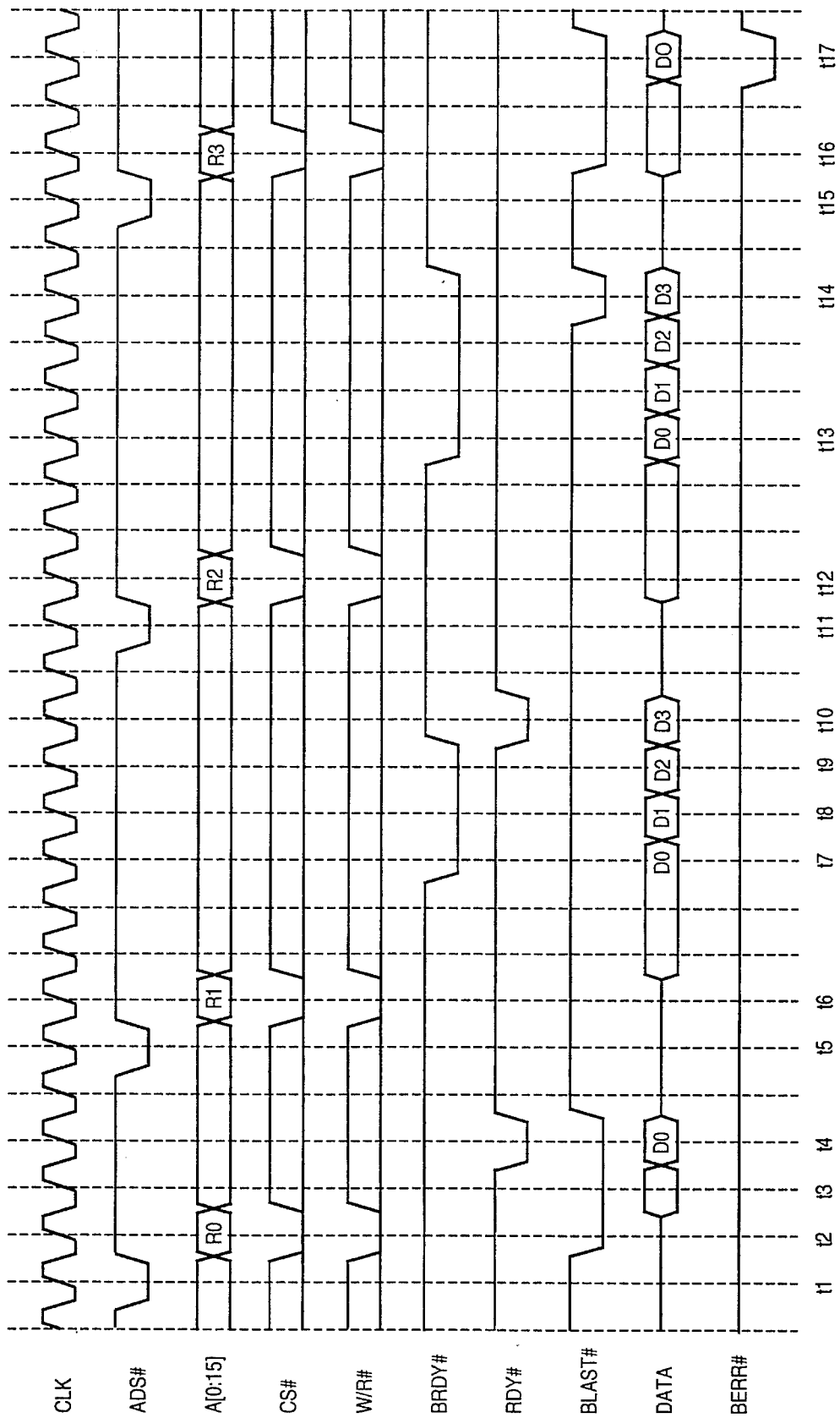
FIG_3N DATA READ CYCLE IN NORMAL AND MC MODES

DISTANCE CALCULATING NEURAL NETWORK CLASSIFIER CHIP AND SYSTEM

FIELD OF THE INVENTION

The invention relates to the field of neural network based classifier systems using distance metrics and radial basis functions for the classification of an unknown input vector.

BACKGROUND OF THE INVENTION

Neural networks have been applied to numerous classification problems involving large input data vectors. In many cases the practical, rather than research, applications have been limited by the availability of hardware suitable to the implementation of real-time on-line classification systems such as for speech recognition.

Most prior attempts at the practical implementation of classification of visual and speech signal data vectors have been based on the use of perceptrons or McCullough-Pitts (M-P) type artificial neurons organized into a multilayer neural network.

FIG. 1 shows a typical M-P type neuron having N input terminals 11 for accepting an input vector, $X=[x_1, x_2 \ldots x_N]^T$. The N elements of vector X are each applied to a weighting element 12 that forms product terms, $\{w_i, x_i\}$, representing the product of each input vector element, $x_i$, and a corresponding element, $w_i$, of the weighting vector, $W=[w_1, w_2 \ldots w_N]^T$. These product terms are summed by adder 13 to form the vector-dot product $$X^T \cdot W = \sum_{i=1}^{N} x_i w_i \tag{1}$$

This vector-dot product is proportional to the cosine of the angle between vector, or $$X^T \cdot W = |X||W|\cos\theta \tag{2}$$

or $$\cos\theta = \frac{[X^T \cdot W]}{[|X||W|]} \tag{3}$$

where |X| and |W| are the magnitude (norms) of vectors X and W respectively. Thus, for a given data vector, X, and reference weighting vector, W, the dot product $X^T \cdot W$ is maximum when the angle between the two vectors, $\Theta=0$, and minimum when $\Theta=90°$. Equation (3) indicates that the normalized dot-product is maximum positive (cos $\Theta=1$) when the two vectors are proportional (i.e., identical except for scale) and maximum negative (cos $\Theta=-1$) when the two vectors are proportional but "pointing" in opposite directions ($\Theta=180°$). Thus, the output of adder 13 is a measure of the angular separation of vectors X and W.

In addition, an offset signal, $x_0$, may also be applied to adder 13 through offset terminal 14. This offset may be combined with the input vector by defining $X=[x_0, x_1, x_2 \ldots x_N]^T$ and $W=[w_0, w_1, w_2 \ldots w_N]^T$, where $w_0=1$, so that the combined output of adder 13 is $$X^T \cdot W = \sum_{i=1}^{N} x_i w_i \tag{4}$$

which is another vector dot-product. Thus, if normalized input and weighting vectors, X/|X| and W/|W|, were used, the output of adder 13 would be representative of cos $\Theta$.

The output of adder 13 is applied to an output nonlinearity (or squashing function) 15 having saturating characteristics such as shown in FIG. 2. FIG. 2(a) shows a typical sigmoidal nonlinear transfer characteristic while FIG. 2(b) shows a hard limiting form of the sigmoidal function, i.e., a signum function, the latter producing a binary output in response to the input data vector and threshold signal.

The M-P type of neuron classifies by using hyperplanes for separating the vector space so that each neuron accepting an N-dimensional data vector, X, divides the N-dimensional vector space into two pans by means of the hyperplane which is defined as follows:

$$x_0 + w_1 x_1 + w_2 x_2 + \ldots + w_N x_N = 0 \tag{5}$$

For purposes of explanation, consider the two-dimensional case (N=2). Equation (5) becomes $$x_0 + w_1 x_1 + w_2 x_2 = 0 \tag{6}$$

or $$x_1 = -\frac{w_2}{w_1} x_2 - \frac{x_0}{w_1}$$

FIG. 3 is a plot of equation (6). In this case the hyperplane, $x_0+w_1x_1+w_2x_2=0$, has degenerated into a line that separates the $(x_1, x_2)$ plane into two regions. When $w_1x_1+w_2x_2>-x_0$, the output is positive (high) and corresponds to region 1 of the plane, and when $w_1x_1+w_2x_2<-x_0$, the output of the M-P neuron is negative (low). Thus, the value of the threshold, $x_0$, together with the weights, $w_1$ and $w_2$, determine the $x_1$ and $x_2$ intercepts of the two-dimensional hyperplane.

In order to define a closed region 3 within the $(x_1, x_2)$ plane, at least three hyperplanes are needed, as shown in FIG. 4. In general, N+1 hyperplanes are required to define a closed region within an N-dimensional vector space.

This implies that the hidden layer of an N-dimensional classifier system requires at least N+1 M-P type neurons, in the most general case, in order to define a single closed region of N-dimensional vector space. The recognition of M classes in the N-dimensional space requires an additional layer of M output neurons. FIG. 5 shows an example of an M-P type neural network classifier for N=4 and M=3. If the three classes correspond to three distinct closed regions, as many as 3(N+1), M-P neurons may be required.

A distance or difference type neuron (d-neuron) is more effective in defining a closed region of N-space. A typical d-neuron, as shown in FIG. 6, represents the basic type of neuron used in the present invention. Input terminals 21 accept the input data vector, $U=[u_1, u_2 \ldots u_N]^T$, that is to be classified. Input terminals 26 are for accepting a candidate prototype vector, $P=[p_1, p_2 \ldots p_N]^T$, which, together with input data vector U, is applied term by corresponding term to the N distance metric units 22 where a set distance terms, $\{d(u_i, p_{ji})\}$, are formed at the output.

Typical distance metrics have the form of the Minkowski norm, $D_q(U, P_j)$, is given by $$D_q(U, P_j) = \left[ \sum_{i=1}^{N} |u_i - p_{ji}|^q \right]^{1/q} \tag{7}$$

or $$D_q(U, P_j) = \left[ \sum_{i=1}^{N} d_q(u_i, p_{ji}) \right]^{1/q}$$

FIG. 7(a) illustrates the N=2 first order (q=1) Minkowski distance metric, also known as the "city block" distance metric, where the distance $D_1(U, P_j)$ is the sum of the absolute differences $|u_2-p_{j2}|$ and $|u_1-p_{j1}|$. The perimeter of the diamond-shaped area centered about $(p_{j1}, p_{j2})$ represents the locus of all points that are the same "city block" distance, $D_1$, from $(p_{j1}, p_{j2})$. FIG. 7(b) illustrates the q=2 or quadratic Minkowski (Euclidean) distance metric $D_2 (U, P_j)$ together with the locus of points that are the same Euclidean distance, $D_2$, from $(p_{j1}, p_{j2})$. Other positive integer or fractional values of q are also suitable for forming a Minkowski distance metric. The Minkowski metric defines a generalized $q^{th}$ order hyperspheroidal closed surface of constant radius.

Referring back to FIG. 6, the set of terms, $\{d_q (u_i, p_{ji})\}$, are summed by adder 23 to form the complete distance norm $D_q (U, P_j)$ at its output. Radial basis function (RBF) generator 25 accepts the distance metric from adder 23 and produces a nonlinearly transformed output.

Typical nonlinear transfer characteristics that may be representative of RBF generator 25 is shown in FIG. 8. Note that because $D_q \geq 0$, the nonlinearity is only defined for $D \geq 0$. FIG. 8(a) produces a value, y=1, if the distance metric $D < \overline{D}$, otherwise y=0. This indicates that when U is close to the prototype vector $P_j$, $D < \overline{D}$ causing the output to be high. FIG. 8(b) shows an exponentially decaying transfer characteristic $y = e^{-D/\overline{D}}$. FIG. 8(c) is a gaussian-like half bell of the form, $y = e^{-\frac{1}{2}(D/\overline{D})^2}$. These transfer characteristics are useful for representing probabilities based on the distance metric, D.

One significant property of the d-neuron of FIG. 6 is that the output of a single d-neuron may be equivalent to an N-input, 1-output, two-layer neural network of M-P type neurons because each N-input d-neuron defines a closed region in N-space. For example, consider the Euclidean or second order Minkowski norm in two-dimensional (N=2) space.

$$D_2(U,P_j) = [|u_1-p_{j1}|^2 + |u_2-p_{j2}|^2]^{1/2} \quad (8)$$

This corresponds to the circular locus defined in FIG. 7(b) where $D_2 (U, P_j)$ is the radius and $(p_{j1}, p_{j2})$ is the center and encloses the area bounded by the locus. In a similar fashion, the three-dimensional Euclidean norm becomes $$D_2(U,P_j) = [|u_1-p_{j1}|^2 + |u_2-p_{j2}|^2 + |u_3-p_{j3}|^2]^{1/2} \quad (9)$$

which defines sphere with radius $D_2 (U, P_j)$. In general, $$D_2(U, P_j) = \left[ \sum_{i=1}^{N} |u_i - p_{ji}|^2 \right]^{1/2} \quad (10)$$

defines a hyperspheroid in N-space. Hence, a single d-neuron is capable of defining a closed hyperspheroidal region while an M-P neuron is only capable of defining a single hyperplane that divides an N-space. This further implies that a neural network of M-P neurons with N+1 neurons in the hidden layer, and one neuron in the output layer is required to define an N-space closed region.

The $q^{th}$ order Minkowski norm (equation (7)) may be considered as defining a generalized $q^{th}$ order hyperspheroid with radius $D_q (U, P_j)$. Thus, the square locus in FIG. 6(a) is a first order, two-space hyperspheroid with radius $D_1 (U, P_j)$.

Because of the enhanced discrimination in N-space achieved by the d-neuron and the possible consequent reduction in complexity of the neural network achieved through their use, the present invention is directed to the implementation of an efficient integrated circuit structure that leads to more efficient classification system based on d-neurons.

SUMMARY AND OBJECTS OF THE INVENTION

One object is to provide a high speed integrated circuit, massively parallel classifier chip having 512 independent distance calculating units, capable of storing 1024 prototype vectors, and accommodating 64 classes.

Another object is to provide means for using a multiplicity of classifier chips for handling problems requiring more than 1024 prototypes or more than 64 classes.

Another object is to provide an architecture that permits operation with a 40 MHz clock and the classification of up to 33,000 patterns per second using a pipeline mode of operation.

Another object is to provide radial basis function classification capability for input vectors with up to 256 elements.

Another object is to provide probability estimation capability for calculating observation likelihoods for hidden Markov models for use in speech and cursive handwriting recognition.

Another object is to provide a 16-bit microcontroller with 4K of flash instruction memory for support of training algorithms.

Another object is to provide incremental learning that allows new patterns to be learned and adding new classes without adversely affecting established recognition performance.

The adaptive distance calculating (d-type) neural network classifier accepts high dimensionality input pattern vectors and produces at its output classification information by calculating the distance between an input vector and each of 1024 stored prototype vectors. Based on these calculated distances, an output is generated that identifies the classes of prototype vectors that are within a threshold distance of the input vector. If prototype vectors from more than one class fall within a threshold distance of the input vector, a relative probability that the pattern is one of 64 possible classes may be calculated. The d-type classifier is trainable, i.e., given exemplar patterns and associated classifications, suitable prototype fitting parameters are stored for use in classifying unknown data vectors.

BRIEF DESCRIPTION OF THE DRAWINGS

FIG. 1 is a block diagram of a McCullough-Pitts (M-P) type neuron.

FIGS. 2(a) and 2(b) show two types of squashing function nonlinearities.

FIG. 3 demonstrates the classification capabilities of an M-P type neuron.

FIG. 4 shows how the hyperplanes defined by M-P type neurons are used to define a closed region of space.

FIG. 5 is a conventional neural network using M-P type neurons.

FIG. 6 is a block diagram of a d-type neuron based on distance metrics.

FIGS. 7(a) and 7(b) show a first and second order hyperspheroidal two-space discrimination characteristics of a d-neuron.

FIG. 9 is a functional block diagram of an adaptive distance calculating neural network classifier.

FIG. 10 is a table of operating modes.

FIG. 11 is a diagram of the internal bus architecture.

FIG. 12 is a detailed block diagram of the prototype memory array (PA) and the distance calculating units (DCUs).

FIG. 13 is a flow diagram of the incremental distance, $d_i$, calculations performed by the absolute magnitude subtractor.

FIG. 14 is a timing diagram for unit PADCU 21.

FIG. 15 is a functional block diagram of the MU 14 processing pipeline.

FIG. 16 is a block diagram of the on-chip microcontroller.

FIG. 17 shows a memory map for on-chip memory.

FIG. 18 is a detailed block diagram of I/O unit 20.

FIG. 19 is the I/O unit register map.

FIG. 21 is a detailed block diagram of ORAM 202.

FIG. 22 shows the two floating point data formats.

FIG. 23 is a table summarizing the IRAM 203 and ORAM 202 addressing schemes.

FIG. 24 is a detailed block diagram of the PGFLASH memory.

FIG. 25 is the read timing diagram for PGFLASH.

FIG. 26 is the write timing diagram for PGFLASH.

FIG. 28 is a functional block diagram of a probabilistic RCE neural network classifier.

FIG. 29 shows the exponential radial distribution, q (U, j, l) for a first order distance metric.

FIG. 30 shows a two-dimensional multimode probabilistic RCE (PRCE) exponential distribution.

FIG. 31 is a timing diagram demonstrating the external bus protocol for a data write cycle.

FIG. 32 is a timing diagram demonstrating the external bus data read cycle protocol.

DETAILED DESCRIPTION

1. Overview

Figure 8:
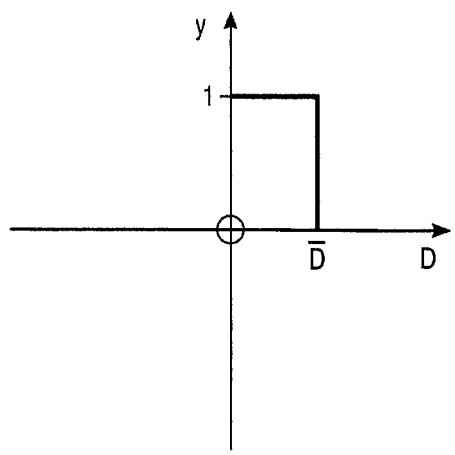
FIGS. 8(a), 8(b) and 8(c) show several different radial basis function output nonlinearities.
Figure 8:
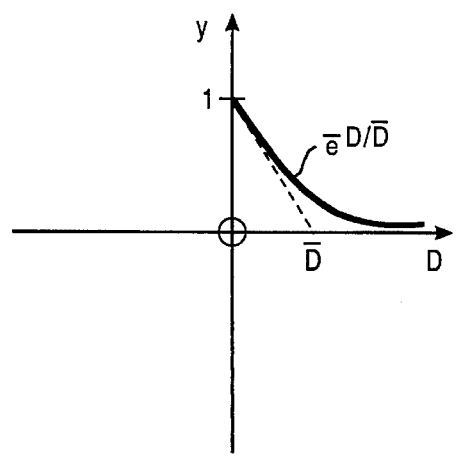
Figure 8:
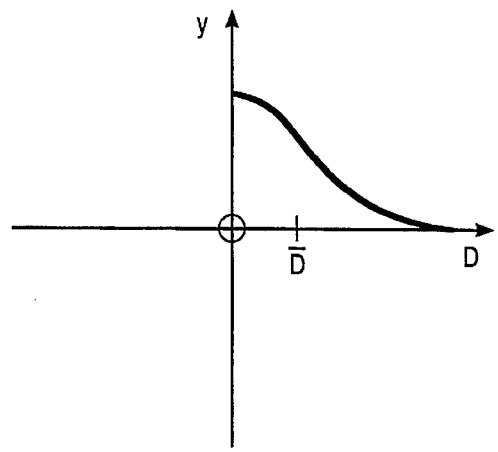

FIG. 9 is a functional block diagram of an adaptive distance calculating (d-type) neural network classifier 10. Input pattern vectors are applied and stored in input buffer random access memory (IRAM) 11. On-chip storage of 1024 prototype vectors is provided by the 1.3-Mbit flash prototype memory array (PA) 13. Distance calculating units (DCUs) 12 compare an input vector from IRAM 11 with the prototype vectors stored in PA 13 by computing the distance between the input and prototype vectors. DCUs 12 have 512 processing units operating in parallel for calculating the "city block" (or first order Minkowski) distance. Each vector distance is compared with a threshold associated with each prototype. If the distance is less than the threshold, a bit is set indicating that this prototype has "fired." Each prototype also has a class tag associated with it for identifying the class to which the prototype belongs. If only one prototype fires, or if prototypes belonging only to a single class fire, the classification is simple, and classifier 10 outputs the class tag associated with the prototype firing.

Prototypes, which are exemplar vectors of a given class, fire when an input vector is close (distance less than threshold).

Distances are calculated by 512 DCUs 12. Because each of the 1024 prototype vectors in PA 13 has 256 components, a total of 256K subtract-accumulate operations must be executed to calculate the 1024 city-block distances used to classify one unknown input vector. By use of pipelining techniques, one subtract-accumulate operation is achieved per DCU per clock period.

The simple fire/no-fire classification method outlined above works well for pattern classification problems in which class distributions are distinct and non-overlapping in feature space. However, when class distributions overlap, prototypes from different classes may fire, obfuscating the proper classification. Sometimes the confusion may be eliminated by looking at the actual distances (rather than fire/no-fire indicators), but it is often necessary to bring additional knowledge to bear in order to choose the most likely classification.

A probabilistic model can be used to resolve the classification confusion when class distributions overlap. One preferred model is commonly referred to as "Parzen Windows." Classifier 10 uses mathematics unit (MU) 14 and prototype parameter random access memory (PPRAM) 15 in conjunction with the distances calculated by DCUs 12 to calculate the class probability that a given input vector belongs to one of 64 classes. MU 14 uses the distances calculated by DCUs 12 and the statistical class parameters stored in PPRAM 15.

MU 14 is a five-stage pipelined processor that executes two multiply operations, an exponentiation, a compare, and an accumulating add operation. Both integer and floating point representations are used in order to achieve sufficient accuracy while minimizing the chip area required to implement the MU 14 circuitry.

Class probabilities are produced in 32-bit IEEE floating point format. The computed class probabilities are ranked and the most probable class chosen in accordance with Bayesian classification theory. The output is available from output buffer random access memory (ORAM) 16.

In addition to the pipeline structure of DCUs 12 and MU 14, the DCUs and MU are also pipelined so that when DCUs 12 are calculating distances, MU 14 is calculating class probabilities associated with previously calculated distances. Also, IRAM 11 may be buffering input data while ORAM 16 is emptying previously calculated class probabilities. One pipeline step interval corresponds to 1024 clock periods. Classifier 10 provides a new classification every 1024 clock periods.

The management burden of input/output operations has been minimized so that a single system administrative controller may be able to manage a multiplicity (on the order of 10) classifier 10 chips without causing any of the classifier chips to stall their pipelines while waiting for I/O service.

Microcontroller (MC) 17 and program store (PGFLASH) 18 are used to control the internal operations of classifier 10. PGFLASH 18 is a nonvolatile flash program memory with a capacity of 4K 16-bit words.

Classifier chip 10 uses information stored in the large on-chip memories (PA 13 and PPRAM 15) in order to carry out its classification calculations. The process by which the on-chip memories get written is called training, adaptation, or learning. Exemplar learning patterns are presented along with correct classifications, and the chip is given a command to learn. MC 17 accepts the learn command, executes a learn program, and compares the classification results with the proper (desired) classification. Errors in classification are used to change the stored on-chip information. The program may store the exemplar vectors, or it may modify stored prototype parameters.

The classifier chip is packaged is a 168 lead ceramic pin grid array package. The significant address, data, bus cycle definition, bus cycle control, interrupt-related, and other miscellaneous signal/pin definitions are listed below for convenient reference in conjunction with the detailed description that follows.

| Pin Name | I/O | Description and Function |
|---|---|---|
| | | Address and Data |
| A[0:15] | I | Address pins used to address command and status registers, microcontroller program memory, prototype vectors, prototype parameters, and other control registers located on chip. |
| D[0:63] | I/O | Bidirectional Data Bus. Pattern vectors for classification are input and classifications or probabilities are output on these pins. Status and control information can be read or written via this bus by applying appropriate addresses. Also, the microcontroller program may be written or verified via these pins. 64-bit and 32-bit modes are supported. |
| | | Bus Cycle Definition Signals |
| CS# | I | Chip select used to select one of multiple chips sharing common address and data buses. |
| PD# | I | Power down used to put the chip into a low power state. The distance calculation units are idled when PD# is taken low. |
| W/R# | I | This pin indicates whether data is to be read from or written to the chip. A low level indicates a read operation. |
| MC# | I | MC# is taken low to access the microcontroller's program memory store. The flash program memory can be read or written. |
| 64/32# | I | This pin is used to select 64-bit or 32-bit bus operation. A low level on this pin invokes a 32-bit bus operation. |
| TEST# | I | A low level on the TEST# input puts the chip in test mode. In test mode, data in the various memory blocks and control/status registers on chip may be read or written. The microcontroller enters a halt state when TEST# is asserted. |
| CMON# | I | A low level on this pin when the chip is in 32-bit bus mode enables internal address and data buses to drive the high 32 data bus pins. Useful for monitoring internal chip operation. This pin should be tied high in normal operation. |
| SCR# | I | This active low pin is used during testing of the FLASH memories. It should be tied high during normal operation. |
| | | Bus Cycle Control |
| ADS# | I | The address strobe input is sampled on the rising edge of the clock and indicates the start of a bus cycle. |
| BLAST# | I | This input tells the chip that the current data word being transferred on the bus is the last word in this bus cycle. BLAST# is sampled on the rising edge of CLK. |
| BRDY# | O | BRDY# tells the host that the current data word is valid, but that there will be more data at the next rising edge of CLK. |
| RDY# | O | RDY# tells the host that the current data word on the data pins is valid and that it is the last data word in this bus cycle. |
| BERR# | O | BERR# tells the host that a bus error has occurred such as writing to the input buffer when the input buffer is full or accessing the output buffer before data is available. |
| | | Interrupt Related |
| IACK# | I | IACK#, interrupt acknowledge, is taken low to tell the chip that its interrupt has been received. |

-continued

| Pin Name | I/O | Description and Function |
|---|---|---|
| SRQ# | O | SRQ#, service request, is asserted by the chip to indicate that output data is available, an error has occurred, or the microcontroller is seeking other action by the host. |
| MCINT# | I | MCINT#, microcontroller interrupt, is used by the host to force the microcontroller to jump to a fixed program address. Typically, this address will be the start of an interrupt service routine stored at address 0 of PGFLASH. |
| ERROR# | I/O | ERROR# indicates that an internal error has occurred on this chip, such as data underrun or overrun in one of the I/O buffers. The status registers should be read to determine the exact cause of the error. |
| RESET# | I | This asynchronous reset pin halts all processing on chip and brings the chip to a known internal state. All volatile internal variables are cleared. If RESET# is taken low while a prototype is being written, that prototype may be in an unknown state. Reset may also be accomplished by setting bit 15 of the command register to a 1. To exit the reset state, the host must write a 0 to bit 15 of the command register. The microcontroller begins execution at address 1. |
| | | Miscellaneous |
| MULTICHIP# | I | This input pin tells the chip that it is incorporated in a system with other chips. Various modes of operation require this information to alter data flow, primarily during learning. This signal is active low. |
| CLK | I | External clock used to drive all internal synchronous circuitry. |
| VCX | P* | +5V supply for prototype array, PGFLASH, and prototype flash arrays. |
| VPP | P* | +12V programming voltage supply for the microcontroller program memory and the prototype array. |
| VCC | P* | +5V/3.3V power supply. |
| VSS | P* | Ground. |

* "P" represents a power supply pin.?

2. Operating Modes

The d-type classifier supports eight basic operating modes. Descriptions of these modes are summarized in the mode table of FIG. 10.

The first three modes, Disable, NORMAL Write, and NORMAL Read, are the primary modes of operation used during classification and learning.

The PGFLOAD and PGFREAD modes are used to load a program for use by on-chip microcontroller 17.

Test modes TEST(1), TEST(0), and PGFTEST are used only during system verification and for some software debugging procedures.

Four mode control pins are used to select the operating mode as follows:

| | |
|---|---|
| CS#: | Chip select pin, used to select one out of a multiplicity of classifier chips; |
| WR#: | Read/write pin, when low indicates a read operation; |
| MC#: | Read/write access to PGFLASH 18 memory of MC 17, when low; and |
| TEST#: | Test mode select when low. |

The three column groupings of the table of FIG. 10 under the header "Data Bus" define the assignment of the 64 data pins of data terminal 24 of FIG. 11. The subcolumns CT and DF refer to the connection type and direction of data flow, respectively. CT may be one of three types: b, indicating a buffered connection; d, indicating a direct pass gate connection; and x, indicating a don't care situation. DF may show as: I, O, or I/O indicating input, output or both input or output, respectively; A indicating an analog connection; U indicating undetermined; ** indicating some I and some O pins.

The last column group defines the data address bus assignments together with the CT and DF information as defined above.

The buses referred to in FIG. 10 are defined in the drawing of the classifier internal bus architecture shown in FIG. 11.

The D0 through D63 (D[0:63]) data bus pins are segmented into 8-bit class designations; 16-bit register MC 17 instructions or data groups; two 32-bit IEEE floating point numbers; or 8-bit input vectors.

When the restricted coulomb energy (RCE) classification algorithm is used, 8-bit data bytes are used to transmit the identification of the firing classes. Six bits of each 8-bit byte are used for class identification while the remaining two are used for information about classification confidence and byte alignment. Thus, the bytes are assigned to D[0:7],D[8, 15],D[16,23],D[24,31],D[32,39],D[40,47],D[48,55], and D[56, 63], while bits D7, 15, 23, 31, 39, 47, 55, and 63 are used to indicate valid classes when any of these bits is high. Bits D6, 14, 22, 30, 38, 46, 54, and 62 may be used to indicate that one or more of the firing prototypes of a given class have a threshold which exceeds the minimum threshold value which implies that a high degree of confidence may be placed on the class indicated by the high state of these bits.

When the probabilistic restricted Coulomb energy (PRCE) classification algorithm is used and when operating in the 64-bit mode, 32-bit class probability densities are available on the bus locations D[0:31] and D[32:63] at each clock cycle. The chip supports an output rate up to 40 MHz.

When in the LEARN mode, an exemplar vector of pre-specified dimension is written into an input buffer (IRAM 11) in I/O unit 20 of FIG. 11. The input exemplar vector write is followed by writing a class identification byte into an output buffer (ORAM 16) in I/O unit 20. A control word is then written to one of the general purpose I/O registers in unit 20 for communicating to MC 17 that the vector and its associated classification should be "learned."

Input vector components are supplied in 5-bit groups within 8-bit bytes with the data occupying the upper (most significant) bits, e.g., the first vector component should be put in on pins D[3:7] with position D7 representing the most significant bit.

In the NORMAL mode, the d-type classification chip may be either operating in the classification or learning mode. It also interacts cooperatively with a system administrator as a slave processor. The chip reacts to an active low SRQ# pin for requesting service by accepting input vectors and delivering classifications through I/O unit 20. The classification pipeline may be thus enabled or the chip may operate under control of on-chip MC 17 for learning or other housekeeping. The NORM mode permits commands to be written to and status to be read from the chip.

The chip is disabled whenever pin CS# is high.

The PGFLASH program load (PGFLOAD) mode forces MC 17 into a halt state while program data is being written to PGFLASH 18, the program flash memory. PGFLOAD is activated by setting MC# low and W/R# high to indicate a write operation to PGFLASH 18. The 16 low order address pins 25 (A[0:15]) are used to address memory locations into which instructions are to be written. Pins 25 drive the internal program address bus (PABUS) and are latched into a program address register associated with PGFLASH 18. The address is latched coincidentally with writing of the instruction into a second register in address unit 22. Once the instruction and address have been latched in PGFLASH 18, a series of control words are written to the two 16-bit control registers associated with PGFLASH 18, as described in Section 7 (PGFLASH) below.

After MC# is taken high, deactivating PGFLOAD, the MP 17 remains in the halt state until an external interrupt signal is applied or a command is written to the command register of I/O unit 20, which sets bit 15 of this register low.

Other sequences of control words for other operations such as Block Erase and Read may also be accomplished in the NORMAL mode, as described below.

The PGFLASH read mode (PGFREAD) is initiated by both MC# and W/R# being asserted low, the latter indicating a read operation. In this mode, the internal program data bus (PDBUS) drives the external data bus via data pins 24 using the external bus drivers in I/O unit 20. PGFLASH 18 should first be set the read mode while the chip is in the PGFLOAD mode before setting the W/R# pin active low for initiating PGFREAD.

The PGFLASH test mode (PGFTEST) is initiated by setting both MC# and TEST# low at the same time. This causes the program data bus (PDBUS) to be connected to the external data bus via pass gates in I/O unit 20 for allowing host system testing of PGFLASH 18.

The test or direct internal access mode (TEST) is similar to PGFTEST except that access is not restricted to PGFLASH only. Most of the other memory blocks and register are accessible in this mode. Different address and data buses are used to access the chip's resources. TEST mode makes the address bus (ABUS) and data bus (DBUS) accessible. MC 17 is forced into a halt state when TEST# is taken low and MC# remains high, placing the chip in the TEST mode. After TEST# is taken high again, the learning controller remains in the halt state until an external interrupt is applied or a command is written to the chip command register in I/O unit 20. TEST may be used for either read or write operations, as determined by the state of W/R#. When W/R# is high (TEST(1)), it is for write debugging and when asserted low (TEST(0)), it is for read debugging. The use of TEST is restricted to testing and debugging.

The internal bus monitoring mode (MMODE) places the address bus (ABUS) and the data bus (DBUS) on pins D[32:47] and D[48:63], respectively, via buffers in I/O unit 20.

3. Prototype Array (PA) and Distance Calculating Unit (DCU)

Reference to FIG. 9 shows that prototype array (PA) 13 and distance calculating units (DCUs) 12 operate in close cooperation: PA 13 supplies the prototype vector data for up to 1024 prototype or exemplar vectors that are compared with an unknown input vector provided by IRAM 11. Because DCUs 12 is a set of 512 DCU units, comparison of the input vector with 512 of 1024 prototype vectors can be made in parallel (simultaneously). Comparison is made by calculating the city block distance or first order Minkowski metric, $D_{1j}$, between unknown vector, U, and prototype vector, $P_j$, where $$D_{1j}(U, P_j) = \sum_{i=0}^{N-1} |u_i - p_{ij}| = \sum_{i=0}^{N-1} d_{ij} \quad (11)$$

and $$U = [u_1, u_2, \ldots, u_N]^T$$
$$P_j = [p_{1j}, p_{2j}, \ldots, p_{Nj}]^T$$

FIG. 12 is a more detailed block diagram of PA 13 and DCU 12 that make up PADCU 21 of FIG. 11. Flash memory 131 stores bits differentially. Prototype selector 132 selects one of two sets of 512 vectors. Each vector has up to 256 components that are selected one at a time for serial processing. Each component is represented by a 5-bit code and each bit is stored in dual-transistor cells and the bit state is represented by a differential output that feeds the input to sense amplifier 133. Thus, the five differential lines at the input of sense amplifier 133 are converted to a set of five lines whose levels represent the 5-bit binary code of the vector component values. Each sense amplifier unit 133 has a latch for temporarily storing the 5-bit output providing pipelined PA 13 access by buffering the previously accessed vector component. Timing, vector component selection, and control for flash memory 131 are supplied by controller unit 134 which is under program controller of microcontroller 17 via the CBUS.

DCU 12 has 512 parallel processing units made up of absolute subtraction unit 121, accumulator 122, buffer 123, and demultiplexer 124. The 5-bit output from sense amplifier 133 of PA 13 provides the prototype vector component, $u_{ji}$, to absolute subtractor 121 while the PTIBUS, via complementary inverter 126, provides the unknown vector component, $u_i$. The output of subtractor 121 is the absolute difference, $|u_i - p_{ji}|$, which is accumulated in accumulator 122 that comprises a 5-bit adder and 8-bit counter. The 13-bit output corresponding to the city block distance between unknown vector and the $j^{th}$ prototype vector, $D_{1j}(U, P_j)$, is transferred to buffer 123. Buffer 123 alternately latches successive city block distances into one of two buffer latches, ping-pong style. Similarly, the oldest buffered vector difference is made available at output by alternately selecting buffer latches thus allowing pipelined operation of DCUs 12. The output of buffer 123 is applied to selector 124 which either switches the buffer output to MU 14 via PTDBUS or to DBUS. Control and timing of DCUs 12 is by means of controller 125.

FIG. 13 is a flow diagram of the distance calculation performed by DCUs 12. The process begins at step 500 where the binary values for $p_{ji}$ and $u_i$ are assumed to be available from PA 13 and PTBUS, respectively. Step 501 produces the complement of $u_i$ as implied by complementing inverter 126. Step 502 forms the sum, $d_i = p_{ji} + \bar{u}_i$. The sum, $d_i$, is checked in step 503 to see if there is a carry-out, $c_0=1$, and if so, proceeds to step 504 where a least significant bit is added, yielding the absolute difference, $d_i = |p_{ji} - u_i|$. Otherwise, the binary value of $d_i$ is complemented in step 505 yielding the desired value, $d_{ji} = |p_{ji} - u_i|$.

Because up to 1024 prototype vectors may be stored in PA 13 and only 512 DCU 12 processing units are available, two passes are necessary in order to compute the distance between the unknown input vector and the 1024 prototypes if more than 512 prototype vectors are used.

The control scheme for PADCU 21 is designed to reduce loading at the global control driver of MC 17 by providing localized control for each DCU and thereby improving speed of operation by increasing the transition of the local logic control logic.

The localized controls use a function select flag to gate the global control signals that are used in PADCU 21. When the function flag is clear (low), the DCU is disabled with zero power dissipation.

The PADCU 21 selection and decoding paths are as follows:

a) All control signals for sense amplifiers 133, and DCUs 12 are gated with the corresponding function flag;

b) The function flag gated access control paths with DCUs 12 are implemented by NMOS style decoder circuits with pull-up load. The latching of distance buffers 123 and the distance calculations by subtractors 123 and accumulators 122 are pipelined; and c) A separate control access path to PA 13 is provided that is similar to conventional memory structures.

The distance calculation for 512 prototype vectors takes two clock periods for a flash EPROM array read and is accomplished at the same time as a previously acquired set of 512 vector values have the incremental distance ($d_{ji}$, j=0, 1 ..., 511 or 512, ..., 1023) computed. Thus, distance calculations and PA 13 accesses are pipelined and completed in 514 clock cycles ((2 clock cycles/vector component)× (256 vector components)+2 clock cycles of delay).

The DCU 12 are also pipelined with the operation of MU 14. When the classifier chip uses 1024 prototype vectors for comparison, the first 512 vector distances, $\{D_{1j}(u_i, p_{ji}), i=0, 1 \ldots 512\}$ are computed in 514 clock periods. The microcontroller, MU 17, then proceeds to calculate the next set of 512 vector distances, $\{D_{1j}(u_i, p_{ji}), i-512, \ldots, 1023\}$, while MU 14 postprocesses each of the previous 512 distances at the rate of one distance per clock cycle for 512 cycles. In this way, MU 14 postprocessing of the 512 distances overlaps the calculation of the next set of 512 vector distances.

FIG. 14 shows the timing of PADCU 21. Trace (1) is the chip clock waveform, CLK. The prototype memory array output, $p_{ji}$, shown in trace (2), is skewed by one-half cycle in order to minimize digital power supply transients (noise). Trace (3) shows the latching timing for the output buffer of sense amplifier (SA) 133. Trace (4) shows the calculation interval for $d_{ji-1} = |p_{ji-1} - u_{i-1}|$ which is accumulated in accumulator 122 at the times shown in trace (5).

4. Math Unit (MU)

Reference to FIG. 9 shows that math unit (MU) 14 operates on the output of DCUs 12 using prototype parameters stored PPRAM 15. Also, reference to FIG. 11 shows that MU 14 is coupled to PPRAM 15 by means of the 48-bit memory data bus (MDBUS). PPRAM 15 is a 256×16 bit general purpose random access memory using six transistors per memory cell.

In addition, FIG. 11 shows that MU 14 consists of a math processor unit (MPU) 19 and a math unit random access memory (MURAM) 26. Calculated results such as a listing of class probabilities and firing classes are temporarily stored by MPU 19 in MURAM 26. In order to provide pipelined operation of MU 14, MURAM 26 consists of two identical RAM buffer blocks, similar to the structure of IRAM 11. This allows MPU 19 to fill one buffer while previously calculated data in the other buffer is being transferred to I/O unit 20 via the CBUS. Upon system RESET, MURAM 26 is cleared by the control hardware.

In order to provide sufficient precision for probability density function calculations required for the PRCE mode, an internal 16-bit floating point format is used. The 16-bit word consists of a 10-bit fraction field and a 6-bit signed exponent field.

FIG. 15 is a functional block diagram of the MU 14 pipeline processor. The six-stage pipeline is structured so that both RCE and PRCE calculations are processed in parallel. The first stage of the pipeline begins with the five pieces of data latched in the five data latches labeled "first stage latches." The beginning of each subsequent stage is similarly labeled. The processing delay at each stage is determined by the longest of the six processing delays.

For purposes of explanation, the operation of the pipeline may be best explained by first considering the processing required for producing the exponential value $e^{-kD}$.

Because the computation of an exponential value, $e^{-y}$, given y, is computationally intense (in general), it is important that an algorithm be used that provides adequate speed in computation without great hardware complexity and cost. The algorithm chosen uses a three-step process involving: reduction of the argument; simple computation and table lookup of the reduced components of the argument; and a simple recombination of the components to form the desired exponential value. The hardware algorithm implementation is based on the following algebraic development.

Given the value y, it is required that $e^{-y}$ be computed with minimum acceptable error. Because hardware prefers binary operations, let $$e^{-y} = 2^{-x} = 2^{-y \log_2 e} \quad (12)$$

Note that if $y \log_2 e = A.B$ where A is the integer portion, B the fractional portion of a binary number, and (.) represents a binary "decimal" point, then $$A.B = A.0 + 0.B \quad (13)$$

so that $$2^{-A.B} = 2^{-A.0} \cdot 2^{-0.B} \quad (14)$$

This, expression implies that the first term on the right is simply a binary fraction and thus $-A$. corresponds to a "floating point" exponent. The second term, $2^{-0.B}$, is a fractional power of 2 which is not readily computed.

If the fractional portion, 0.B, is limited to a small number of bits, a table lookup procedure could be used to evaluate the quantity $2^{-0.B}$. Because 0.B may have too many bits to allow a simple lookup table, a truncated approximation may be required. With this in mind, let $$0.B = 0.M + \xi \quad (15)$$

where 0.M represents the first M most significant bits (msb's) of B and $\xi$ is a fractional binary number with M leading zeros. As a result, substitution in the previous expression yields $$2^{-A.B} = 2^{-A.} \cdot 2^{-0.M} \cdot 2^{-\xi} \quad (16)$$

where $2^{-\xi} < 2^{-M}$. But $2^{-\xi}$ may be represented by a Taylor series (polynomial) expansion as $$2^{-\xi} = 1 - \xi \ln 2 + \frac{(\xi \ln 2)^2}{2!} - \frac{(\xi \ln 2)^3}{3!} + \ldots \quad (17)$$

Because the quantity $\xi \ln 2$ is small, $$2^{-\xi} \cong 1 - \xi \ln 2 \quad (18)$$

Using this last approximation obtains $$2^{-A.B} = 2^{-A.0} \cdot 2^{-0.M} \cdot (1 - \xi \ln 2) \quad (19)$$

which shows that the exponential can be evaluated by:
a) partitioning the exponent A.B into three parts (the integer portion, the truncated msb portion of the fractional portion, and a residual $\xi$);
b) obtaining the value of $2^{-0.M}$ by table lookup while calculating the quantity simple polynomial $(1-\xi \ln 2)$;
c) forming the triple product indicated or, if using a floating point format, using the quantity $-A$. as the exponent, and the product $2^{-0.M} \cdot (1-\xi \ln 2)$ as the fractional part.

Referring back to FIG. 15, latches (1, 1) and (1, 2) contain the quantities K and D, respectively. The quantity, D, represents a distance value calculated by PADCU 21 and supplied via the PTDBUS while K is a "normalized" exponential delay factor obtained from SRAM 23 and related to the delay factor, k, by $$K = k \cdot \log_2 e \quad (20)$$

It desired to find the value $e^{-kD} = 2^{-KD}$ by use of the algorithm described above.

The product K.D is formed by multiplier 401. The output is operated on by a reduction circuit that separates the binary quantity K.D into an integer, S, stored in latch (2, 1), a truncated fractional part, T, stored in latch (2, 2), and a residual fractional part, $\xi$, stored in latch (2, 3). During the second stage, the value, T, is used to address a read only memory (ROM) to obtain the value $2^{-T}$ which is then stored in latch (3, 2). In parallel, the product $\xi \cdot \ln 2$ is formed and stored in latch (3, 3). The integer exponent, S, is transferred to latch (3, 1). Multiplier 403 and adder/subtractor unit 404 form the value $2^{-T} \cdot (1-\xi \ln 2)$ as a floating point number placing the fractional part in the appropriate portion of latch (4, 1) and combining adding the exponent to S to form the exponent portion of the quantity $e^{-kD}$ in latch (4, 1).

The probability $C_j \cdot e^{-kD}$ is computed by floating point multiplier 405 using the contents of latches (4, 1) and (4, 1) and storing the results in latch (5, 1). The floating point apriori probability value, $C_j$, has been passed from latch (1, 3) through latches (2, 4), (3, 4), and (4, 2) during the previous three stages of processing.

While the above pipeline activity was taking place, the threshold value, $\lambda$, in latch (1, 4) and class indicator in latch (1, 5) were also being processed in parallel.

Adder unit 402 is used to take the difference between $D_j$ and $\lambda_j$ for determining if the distance between the unknown vector, U, and the prototype vector, $P_j$, is less than the threshold, $\lambda_j$. If so, the class to which $P_j$ belongs is said to have fired. The firing is recorded by incrementing the index f associated with the class indicated and stored in the latches of column 5.

The class pointer in latch (4, 3) is again used to address SRAM 23 in order to recover cumulative probabilities. Latch (5, 2) temporarily stores this value which is added to the probability stored in latch (5, 1) by adder 406. The updated cumulative probability out of adder 406 is buffered in latch (6, 1). Class pointer in latch (6, 2) is then used to store the updated cumulative probability in SRAM.

5. Microcontroller (MC)

On-chip microcontroller MC 17 is a general purpose controller used for learning, initialization, and other software-based chip accesses. It is a two-stage pipelined controller with a microinstruction read only memory (ROM) of 32 bits×128. A block diagram of MC 17 is shown in FIG. 16.

MC 17 provides for parallel access to both program memory and data memory by means of PDBUS-PABUS and ABUS-DBUS, respectively. Two 16-bit internal buses, XBUS and YBUS are also provided. XBUS is bidirectionally coupled to DBUS via data register (DR) 501. YBUS is bidirectionally coupled to ABUS via two (DS1, DS2) data segment registers 502 and ABUS address generator 503. PABUS is accessed through selector 504 allowing either the ALU 522 output or the incremented (PC_N+1) program counter register of PC unit 506 to be selected. PC 506 also provides two previous program counts to registers PC 507 and PC_L 508 that are both coupled to XBUS.

Access to the MC 17 16×64-bit stack 510 is controlled by stack pointer register (SP) 509. SP 509 can be written to via YBUS and the stack registers are bidirectionally coupled to XBUS.

PDBUS couples into MC 17 through instruction register (IR) 516. Instruction decoder (ID) 517 interprets the coded microinstruction supplied by IR 516 and distributes the necessary control signals throughout MC 17 on control bus (CNTLs) 523. The data on PDBUS is also made available to immediate (IMM) register 515 and then to either XBUS or YBUS. ID 517 also controls access to the four general purpose registers (R0–R3) and the two read-only registers (ZERO and ONE) by means of selectors (SRA, SRB) 518 and 519 and decoders 520. The output of these registers is available to XBUS and YBUS.

Register ALUIA 513 and ALUIB 514 provide operands to ALU 522 from XBUS and YBUS, respectively.

Flag register (Flags) 511 is a 4-bit binary coded error flag indicator providing error and status information about MC 17, MU 14, PADCU 21, and I/O unit 20. Register IY 512 is used to latch the value loaded on the YBUS.

FIG. 17 is a memory map indicating hexadecimal address allocations on the ABUS. The high end (F000-FFFF) is devoted to PGFLASH, the MC 17 program memory.

Addresses B000-B3FF are for the prototype array (PA) column select of one-out-of 1024. Addresses B800-B8FF are for PA row select of one-out-of 256.

Addresses 7700-7720 are the MC 17 PGFLASH program memory control registers.

Probability density function (PDF) array 1 and 2 each occupy 64 16-bit locations between 687F and 6800.

Fired class array 1 and 2 each occupy 64 8-bit locators between 647F and 6400. Bits 0–5 are the firing class label, bit 6 indicates a firing, and bit 7 is undefined. Addresses 6200-6277 are flag bits (64×1) indicating the class has already fired.

Address 6100 is the MU 14 16-bit mode control register. Addresses 60C0 and 6080 contain the firing class count (0–63) for array 2 and array 1, respectively.

Three blocks of PPRAM 15 memory are at addresses 5000-53FF, 4800-4BFF, and 4400-47FF. Address 4381 is the global PPRAM control register, and address 4201, 4101, and 4081 are the PPRAM blocks 1, 2, and 3 control registers, respectively.

PADCU 21 related registers are at 3000 to 3BFF: 3800-3BFF are PADCU used/not-used flags, 1024×1-bit (msb's); 3400-37FF store distances, 1024×13-bit (bits 0-12); 3040 is the PADCU MU control and status register; 3008 indicates the number of prototypes committed; 3004 input vector dimension (1-256); 3002 is the PA mode (PAMD) register; and 3001 is the PA state register used to start the PADCU pipeline.

Address 2800 is ORAM 202 output port for probabilities or class labels. Addresses 2000 to 22FF are IRAM 203 related: 22FF-2200 and 21FF-2100 are section 1 and section 2 IRAM input buffer, each 256×5-bit; 2100 is the pattern input address; and 2000 is the IRAM input port register.

1C00 and 1C01 is for a 32-bit timer low and high word, respectively, which is reset to zero when the chip is reset.

1000-10FF is for use as a general purpose 256×16-bit RAM.

Address 0000-0078 are I/O registers.

ALU supports a rich set of mathematical and logical operations including the following.

| | |
|---|---|
| ADD: | Register to register addition. |
| ADC: | Same as ADD but with carry-bit. |
| SUB: | Register to register subtraction. |
| CMP: | Register to Register compare, affects flags only. |
| INC: | Increment register contents. |
| DEC: | Decrement register contents. |
| AND: | Register to register Boolean AND. |
| OR: | Register to register Boolean OR. |
| NOT: | Single register logical complement. |
| XOR: | Register to register exclusive-OR. |
| SHR: | Shift right one bit. |
| SHL: | Shift left one bit. |
| SHRL: | Rotate right one bit. |
| SHLL: | Rotate left one bit. |

6. Input/Output Unit

The architecture of input/output (I/O) unit 20 of FIG. 11 is shown in greater detail in FIG. 18. I/O unit 20 has: an external bus interface (XBI) 201 for electrically and logically coupling I/O unit 20 to a host system bus; an internal bus interface (IBI) 205 for coupling to the DBUS; an input random access memory (IRAM) 203 for receiving unknown vectors for classification from the host system and for delivering unknown vector data directly to PADCU 21 via PTIBUS; an output random access memory (ORAM) 202 for receiving classification results from the dual-ported MURAM 26 of MU 14 via POBUS and for buffering the classification results until the host system can read them; and I/O registers 204 that have the dual function of controlling the operating modes of IRAM 203 and ORAM 202 and of acting as "mailboxes" for communicating information between the host system and the on-chip microprocessor, MC 17.

I/O registers 204 comprises sixteen 16-bit registers that occupy hexadecimal addresses 0000 to 0078 in the memory space of MC 17 and of address pins A[0:15] of address pin unit 25. These registers are used to:

1) unreset the chip;
2) accept classification parameters including vector dimensions and classification mode (RCE or PRCE);
3) accept chip-mode commands for MC 17;
4) provide a reading point for various on-chip hardware signals; and
5) provide for parameter communications between the host system and MC 17.

All I/O registers 204 can be read by the host system and by MC 17, but not all registers may be written to by either the host system or MC 17. FIG. 19 lists the sixteen I/O registers 204 including the hexadecimal address, name, host, and MC 17 read/write (R/W) capability, and explanatory notes. Additional explanatory notes follow below.

CMR (Chip Mode Register) holds chip mode command to MC 17.

Bits [0:14] are for storing a chip mode opcode that is decoded by MC 17.

Bit [15] is the chip reset bit. Writing a zero to this bit position unresets the chip. Either writing or inducing a one by asserting the chip RESET#, MC#, or chip power-up will set this bit to one.

DIM (Problem Dimension Register) is used to specify the parameters of the classification problem including the input (unknown) vector dimensions and the number of output classes desired for the PRCE classification mode.

Bits [0:7], the lower byte, contain the input vector dimension.

Bits [8:15], the upper byte, contain the number of classes desired in the PRCE mode.

IDR (Chip ID Register) is a read-only hard-coded register for chip identification.

SSR (Software Status Register) is only written to by MC 17 and is used to show status information about the MC 17 software to the host system. Bit assignments are user-program assigned.

HS1 (Hardware Status Register 1) is used to store the state of the MC 17 flags by sampling the states at each clock cycle. It is intended for use by the host system. MC 17 software should use the MC 17 built-in flag testing instructions rather than reading HS1. Bit assignments are the same as for the flag numbers (bit n corresponds to the status of MC 17 flag n, n=0, 1, 2, ..., 14).

HS2 (Hardware Status Register 2) is used to indicate the status of hardware units other than MC 17.

Bits [10:15] indicate the operating mode and the filled/empty status of IRAM 203 and ORAM 202.

Bit [0] indicates PADCU 21 is busy processing an input vector.

Bit [1] indicates that MU 14 is busy processing PADCU 21 results.

Bit [2] unused, set=0.

Bits [3:6] contain bits [3:6] of the address of the last I/O register written for use as a mailbox communication system between the host and MC 17.

Bit [7] when one indicates that the host external bus and XBI are 64 bits wide, otherwise 32 bits wide (pin S64_32#).

Bit [8] indicates that the chip is operating in a multichip system when low (pin MULTICHIP#).

Bit [9] indicates that the results loaded (available) in ORAM 202 contain more than one firing class.

Bit [10] indicates that the results contained in ORAM 22 have not been fully read by the host system such as when several bus cycles are required to read out the results.

Bit [11] indicates that IRAM has not been fully written by the host system.

Bit [12] when high indicates that ORAM is in the classification mode and that the results obtained from MURAM 26 may be read out by the host (provided it is not "empty"). If the bit is low (zero), an attempt to read from ORAM 202 is an illegal bus operation which is signified by the chip setting pin BERR# low. Also, bit [12] low indicates that ORAM 202 is in the manual mode and thus read accessible to MC 17.

Bit [13] indicates IRAM 203 is in the classification mode indicating it can accept input vectors from the host (if it is not full). If bit [13] is zero (low), any attempt by the host to write to IRAM 203 is an illegal bus operation, as indicated by pin BERR# set low. Also, when bit [13] is low, IRAM 203 is in the manual mode allowing MC 17 read access.

Bit [14], when high (one), indicates ORAM 202 is full with a result set loaded from MURAM 26. When low (zero), any attempt by the host system to read ORAM 202 is an illegal bus operation, as indicated by pin BERR#.

Bit [15], when high, indicates that IRAM 203 is not full and hence is available to accept an input vector. When low, any attempt to write to IRAM 203 is an illegal operation, as indicated by pin BERR#.

XIR (External Interrupt Register) identifies the reason for a service request (pin SRQ#) to MC 17. When the host system reads its content as hexadecimal value FFFFH, it indicates that ORAM 202 is filled. Bit assignments are host programmed. When MC 17 writes to XIR, the chip's SRQ# pin is asserted low and remains low until the host sets the chip's service acknowledge pin (SACK#) low.

IIR (Internal Interrupt Register) is used to identify the source of an internal interrupt request to MC 17 by the host. Also, the contents may be set by on-chip hardware conditions such as the loading of CMR or by the assertion of pin MCINT# by the host. Each bit position represents a different hardware condition.

Bit [15] indicates that CMR has been loaded.

Bits [4:14] are unused and always read zero.

Bit [3] is set to one only if the host writes a one to it as an indication that the interrupt was caused by the host writing to the IIR rather than caused by hardware.

Bit [2] may be used similarly to bit [3].

Bit [1] indicates that pin ERROR# has been asserted active by the host.

Bit [0] indicates that pin MCINT# has been asserted active by the host.

CRA (Control Register A) is used to monitor the behavior of IRAM 203 and ORAM 202 by the host when operating in the classification mode.

Bits [15:4] are not used but initialized to one upon chip reset.

Bit [3] is the monitor mode select (MPS) bit and, when set to one, causes the upper 32-bit data pads to monitor the PABUS and PDBUS in the monitor mode. When set to zero, the upper 32-bit data pads monitor the ABUS and DBUS in the monitor mode.

Bit [2] is the ORAM service request (OSR) bit that causes ORAM 202 to activate the chip's SRQ# pin when ORAM 202 is full and to load the value FFFFH in XIR. It is initialized to one at reset.

Bit [1], when asserted, causes ORAM to load probabilities (PRCE results) results from MU 14. Otherwise, ORAM is configured to load class data (RCE) results.

Bit [0] indicates that the ORAM classification is on (OCON) and enables the loading of a new set of results into ORAM 202. The value of bit [1] determines whether classes or probabilities are loaded. Loading takes place whenever ORAm 202 is empty and the chip is in the classification mode. Changing the value of bit [1] causes ORAm 202 to execute a local reset and then reloads itself from MU 14 if OCON is true.

CRB (Control Register B) controls the active modes of ORAM 202 and IRAM 203.

Bits [15:13] contain the value of 3 bits of the ORAM 202 control and are used only for on-chip control.

Bit [12] shows the status of the first buffer of ORAM 202 on read (one indicates ORAM full). On writing a one, it sets the ORAM status to full.

Bit [11] on reading shows the status of the second buffer of IRAM 203. Writing a one indicates that the second buffer is full.

Bit [10] on reading shows the status of the first IRAM buffer. Writing a one indicates the first buffer is full.

Bits [9:7] indicates the input/output condition code select (ICCS) to MC 17. At reset, it is initialized to all ones (111). The meanings assigned to this 3-bit code (ICC) is as follows:

| ICC | Interpretation |
|---|---|
| 000: | Bit 1 of CRA has gone to zero. |
| 001: | Bit 0 of CRA has gone to one. |
| 010: | ORAM 202 is full. |
| 011: | IRAM 203 is no longer full. |
| 100: | IRAM 203 has loaded a complete input vector. |
| 101: | ORAM 202 has output a complete results set. |
| 110: | ORAM 202 has multiple classes in the results load into it. |
| 111: | Reset condition only. |

Bit [6], when set to one, indicates IRAM 203 is in the classification mode, otherwise, it is in the microcontroller mode. It is initialized to one upon chip reset.

Bit [5], when set to one, indicates ORAM 202 is in the classification mode, otherwise it is in the microcontroller mode. Chip reset initializes it to one.

Bit [4], when set to one, indicates that ORAM 202 converts PRCE probabilities from MU 14 into IEEE-754 32-bit floating point format. When set at zero, PRCE data is read out of ORAM 202 in the MU 14 internal 16-bit format.

Bits [3:2] are not used but are initialized to all ones.

Bit [1] causes ORAM 202 to remain in reset until a zero is written to this bit. Bit [1] is initialized to one on chip reset.

Bit [0] causes IRAM 203 to remain in reset state until a zero is written to this bit. It is initialized to one on chip reset.

Due to the internal architecture of ORAM 202 and IRAm 203, bits [6:15] should not be changed during the same write operation as bits [1:0].

OP[0:5] (General Operand Registers) are six 16-bit registers used for passing parameters between the host system and MC 17. Their meaning is assigned in the host and MC 17 software.

Thus, IRAM 203 and ORAM 202 are data input and output buffers, respectively, for use in pattern classification while I/O registers 204 are used for mode control and for parameter passing between the host and the chip's MC 17.

ORAM 202 and IRAM 203 may each be in one of the following three major states:

Reset: The buffer is idle and inaccessible.

Classification: The buffer is not reset and is configured for pipeline classification processing.

Microcontroller: The buffer is inaccessible to the pipeline, but MC 17 can access the buffer.

In addition to the three major modes, ORAM 202, when in the classification mode, also has subsidiary control modes that are also controlled through I/O registers 204 as follows:

RCE/PRCE: When CRA[1]=1, ORAM 202 loads PRCE (probability)results from MURAM 14; and when CRA[1]=0, ORAM 202 loads RCE (class) results from MURAM 14.

CONT: When CRA[0]=1, ORAM 202 is enabled to load the next set of results from MURAM 14 as soon as ORAM is empty (either at the start of classification or after the host has finished reading the previous set of results stored in ORAM 202).

OSR: When ORAM 202 is "full," it triggers the SRQ# pin on the chip active (low); SRQ# is triggered only once for each time that ORAM 202 makes a transition from empty to full and also causes XIR to be set with the hexadecimal value FFFFH.

Figure 20:
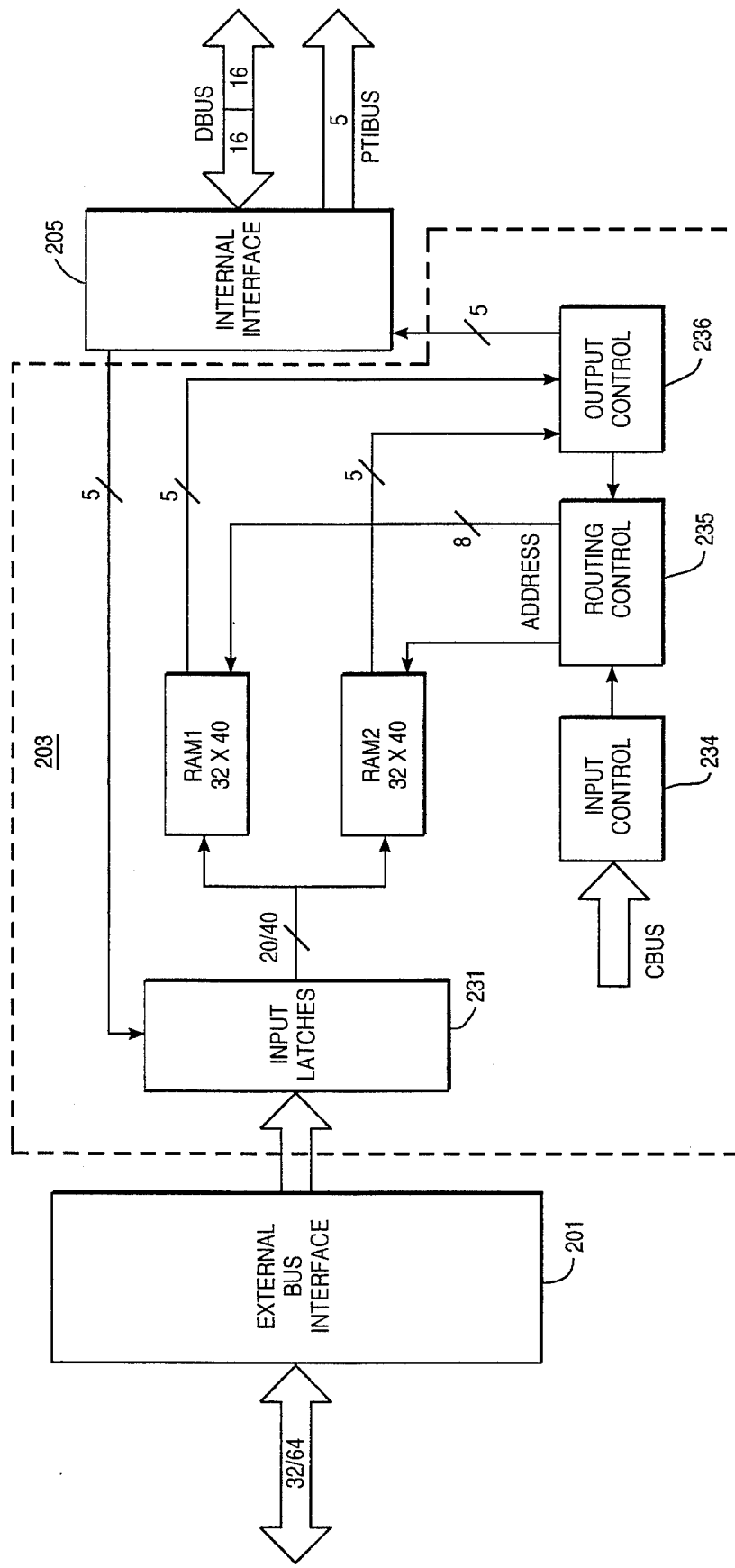
FIG. 20 is a detailed block diagram of IRAM 203.

FIG. 20 is a detailed block diagram of IRAM 203 of FIG. 18 comprising a set of input latches 231, two random access memories, RAM1 and RAM2, input controller 234, routing controller 235, and output controller 236.

When IRAM 203 is brought out of reset (CRB[0]=0), it may be enabled into either the classification or the manual (MC 17 access) mode by means of HS2[13].

Setting HS2[13]=1 places IRAM 203 in the classification mode and, when in this mode, IRAM 203 first loads RAM1 from the input latches 231. The values loaded are the five most significant bits (msb's) of each byte on the external bus via interface unit 201. If the external bus is a 32-bit bus, four 5-bit values (20 bits) are loaded and, if a 64-bit bus is used, eight 5-bit values (40-bits) are acquired by latch unit 231 and delivered to RAM1. The 32/64-bit selection is made by means of the chip's configuration pin S64_32#; a one indicates a 64-bit bus.

IRAM 203 continues loading RAM1 until it reaches full capacity. Capacity is specified by the low byte of I/O register DIM. When full, RAM2 is made available for loading and continues to load until full even though RAM1 is available for loading before RAM2 begins or is in the process of loading. Once RAM2 is loaded, RAM1 is designated as the available buffer, and the cycle of alternating RAM1/RAM2 buffer use continues until reset. This multiplexing of buffers is controlled by input controller 234 and routing controller 235 based on control information supplied by the CBUS. Output controller 236 selects and directs the data read from IRAM, delivering 5-bit values to PADCU 21 via PTIBUS.

Setting HS2[13]=0 places IRAM 203 in the manual (MC 17) mode and allows MC 17 to read the contents of IRAM as a normally addressed block of memory ranging from address 2000–20FF for RAM1 and 2100–21FF for RAM2. Five-bit data values are read as the five msb bits of the least significant byte on the DBUS.

While in the manual mode, MC 17 writing to the above RAM1 and RAM2 addresses causes data to be latched by latch unit 231 into the appropriate register but is not physically written into RAM1 or RAM2. To complete the write, MC 17 must access the addresses by setting bit 10 of the address high (=1), otherwise it will not be written in memory. This feature is required because the line width of either RAM1 or RAM2 (20 or 40 bits wide) is greater than the width of the 16-bit DBUS. A number (4 or 8) of 5-bit loads into latch unit 231 before the full line is written into either RAM.

FIG. 21 is a detailed block diagram of ORAM 202 of FIG. 18. It is made up of an input shift register (SR) 221, random access memory (RAM) 222, latch units 223 and 225, IEEE floating pint formatter unit 224, and internal output multiplexer 226.

ORAM 202 is brought out of reset by (CRB[1]=0) and may be enabled into either the classification mode (HS2[12]=1) or the manual mode (HS2[12]=0).

In the classification mode, ORAM 202 will begin loading from MURAM 14 whenever MURAM 14 completes processing a vector. Either probabilities (PRCE) or classes (RCE) will be retrieved from MURAM 14 depending on the value of CRA[1]. If RCE classes has been selected (CRA[1]=0) and multiple classes fire, HS2[9] is set to one indicating the multiple class firing to the host system. The host system then has the option of changing the results to PRCE probabilities (CRA[1]=1).

MURAM 26 8-bit or 16-bit output data is stored sequentially in shift register 221 until a 64-bit word is built-up for transfer to RAM 222. When the internal data transfer is complete, as indicated by HS2[14]=1, ORAM 202 will wait to transfer data off-chip via external bus interface 201.

If the host has specified RCE class data, the class-number of each firing class will be presented. If PRCE probability data has been specified, ORAM 202 will present at its output the number of classes indicated by DIM[15:8] in one of two formats, as indicated by CRB[4]. If CRB[4]=1, the data that is transferred out of RAM 222 is latched in latch unit 223 and its output is applied to IEEE floating point format unit 224 where the probability values are converted from the internal 16-bit values to 32-bit IEEE floating point format. If CRB[4]=0, the internal 16-bit format is preserved. Format unit 224 also formats the data for either a 64- or 32-bit external bus. The formatted results are latched into latch unit 225 and made available to external bus interface 201. FIG. 22 shows the two formats.

ORAM 202 will automatically continue to load new classification data from MURAM 26 unless CRA[0] is asserted. By asserting CRA[0], the host may have data for a particular classification held in MURAM 26. Because MURAM 26 stores both firing-class and probability classifications for a given input vector, the host may retrieve both firing-class and probability classifications by toggling CRA[1]. If CRA[0] is deasserted, the operation returns to a normal single mode of operation.

MC 17 can also read-access ORAM 202 as a normally addressed block of memory ranging from address 2800 to 283F. Because DBUS is limited to 16 bits, the 64-bit line from RAM 222 is multiplexed onto the DBUS in 16-bit units by 4 to 1 multiplexer (MUX) 2261. Sixteen bits are read at each address for a total of 64 addresses.

MC 17 may also write-access ORAM 202 through SR 221 which shifts either 8 or 16 bits at a time depending on the value of CRA[1]. A write operation is enabled by asserting bit 10 of the address field (2A00 to 2A3F).

FIG. 23 is a table summarizing both the IRAM 203 and ORAM 202 addressing schemes.

7. PGFLASH

PGFLASH 18 is a 64-bit flash EPROM, organized as a 4K word by 16-bit RAM, for storing the microcode for MC 17. FIG. 24 is a detailed block diagram of PGFLASH 18.

PGFLASH 18 has a single block 4k×16 flash main memory 180 that contains two imprint columns for use during testing, X and Y decoders, sense circuitry, and high voltage circuitry. The X and Y decoders select data to be read or written into main memory 180. The sense circuits use reference cells to determine the state of an array cell while the high voltage circuitry provides appropriate voltages for programming, erasing, or stress-testing flash memory cells.

Address register 189 (ADDREG1) is used to store the array read address. This register is loaded automatically from PABUS if the address is in the range F000–FFFF.

Address register 187 (ADDREG2) is used to store the read or write address. When this register contents is read, the address from address multiplexer (MUX) is accessed.

MUX 188 selects the address stored in ADDREG1 or ADDREG2 in accordance with the state of user control registers 182.

Data register 181, at address 7700, is used to store the data to be programmed (written) into flash memory 180.

User control registers 182, a dual set of registers with addresses 7701 and 7702, are used to enable host selectable modes for PGFLASH 18. The register at address 7701 is a 16-bit device, while the register at 7702 is an 8-bit device.

User control register 1 in PGFLASH 18 is located at address 7701. The bit assignments by bit number (0–1sb) and name are listed below.

0: (CDSTSEB) disables pull-down device on array input mode of the sense amplifier.

1: (CEROW) grounds all columns when PGFLASH is not selected and not when the source voltage of the flash cells (VPS) is high.

2: (CNWL) disables word lines during program disturb, standby, and erase.

3: (CYNBL) deactivates the Y-select (YSEL) stage of the two-stage decoding of the flash array bit lines during erase.

4: (CWNBL) deactivates the W-select (WSEL) stage of the two-stage decoding of the flash array bit lines during erase.

5: (CIROWB) grounds imprint columns when imprint columns are not used and CIREF is not active.

6: (CLVPSB) grounds the array VPS.

7: (CESAMPB) enables sense amplifiers except when the gate voltage (VPX) of the flash cells and the W-select devices tracks the externally supplied programming and erase voltage (VPP) and during margin mode.

8: (CREFRCEL) gates single cell read reference voltage to reference drain bias circuit or to the sense node.

9: (CREGATE) enables the gate of the single cell read and erase verify reference cells.

10: (CSCRLOD2) enables a 2 to 1 load ratio for the reference of the sense amplifier.

11: (CIREF) inhibits source of the imprint column when VPX is high voltage, except when in the program verify and HRTB 11 modes.

12: (CHVPS) brings the main array VPS level to VPP during erase.

13: (CSCRSELB) gates SCRs to reference sense node.

14: (CPDDIS) disables all column pull-downs during modes in which all columns must be floated or controlled.

15: (CEDIN) enables data to be programmed.

User control register 2 in PGFLASH 18 is located at address 7702. The bit numbers, names, and assignments are listed below.

0: (RESERVED) reserved bit.

1: (CPGATE) enables the gate of the single cell erase verify reference cell.

2: (CREFPCEL) gates single cell program verify cell to the reference drain bias circuit or to the sense node.

3: (CREFECEL) gates the single cell erase verify cell to the reference drain bias circuitry or to the sense node.

4: (CPGM) brings VPX and Y-select device gate voltage (VPY) to high voltage during programming.

5: (CPGMVER7) enables VPX program verify generator to generate 7 volts during program verify.

6: (CPGMVER) enables VPX program verify generator to generate 7.5 volts during program verify.

7: (ADDREG1) connects address register 1 to the address multiplexer (MUX).

Status Register 183, at address 7703, is used to determine the status of the internal signals as shown below.

| Bit | Name | Description |
|---|---|---|
| 0 | VPSDETL | Array VPS ground detected. |
| 1 | VPYHVD | VPY high voltage detected. |
| 2 | VPXHVD | VPX high voltage detected. |
| 3 | VPPHVD | VPP high voltage detected. |
| 4 | ELVCCB | VCC low voltage detected. |

Test control register 184, address 7705k, is used to enable the test modes for PGFLASH 18.

Analog switch 185 connects the 16-bit lines to analog test bus (TBUS). This allows a current to be measured during flash memory $V_t$-force and leaky column test modes. The former test is used to measure the current-voltage (I-V) characteristics of the flash memory cells while the latter test is for detecting leakage paths in the flash memory array.

Decode and bus logic unit 190 enables the selected register in PGFLASH 18 and also enables bus driver/receiver 186 to control the flow of signals from the bidirectional PDBUS onto the two internal 16-bit unidirectional buses (UNIBUS1, UNIBUS2). Logic unit 190 is controlled by input control signals "read-an-array location or register" (PRDB) generated by MC 17 during NORMAL mode or by I/O unit 20 during PGFLOAD, and "write-an-array location" (PWRB) generated by I/O unit 20. Bus driver/receiver 186 returns PDRDYB indicating to MC 17, or to I/O unit 20, that the bus cycle is complete and, if reading (i.e., PRDB active), valid data will be available on the PDBUS in one clock cycle.

The timing diagrams associated with PGFLASH read operations are shown in FIG. 25 and PGFLASH write operations in FIG. 26.

There are six PGFLASH user modes available.

Standby: PGFLASH disables outputs and high voltage circuits (except for the VPP high voltage detector) and reduces device power consumption. The command sequence requires activating the following signals in User Control Register 1: CLVPSB, CEROW, CIROWB, CNWL, CYNBL, CWNBL, and CSENDIS. All other signals in Control Register 1 are deactivated.

Read: User may read either a 16-bit word or one of the six registers. PGFLASH defaults to this mode after reset in order to ensure that the memory contents are not altered during the $V_{PP}$ power-on transition. The mode may also be initiated by writing the read command to the PGFLASH control registers. The device remains read enabled until the contents of the control registers are altered. The read mode uses a single trimmable flash read reference cell for the sense amplifiers. The read reference cell has a current level whose magnitude can be trimmed by applying programming pulses to a UV erased reference cell.

The command sequence for the read mode is as follows:
1) Activate the following signals in User Control Register 1: CESAMPB, CLVPSB, CREFRCEL, CREGATE, CIROWB, CDSTSEB, ADDREG1, and CSCRLOD2. Deactivate all other signals in User Control Register 1.
2) Activate the following signals in User Control Register 2: CPGATE and CREFPCEL. Deactivate all other Register 2 signals.
3) Program ADDREG1 with address to be read.
4) Read data from PDBUS.
5) If additional data is to be read, go back to step 3, otherwise go to step 6.
6) Enable the standby mode.

Erase: Allows user to erase the entire PGFLASH array by setting all cells to high (logic 1). This mode is initiated by programming the User Control Registers and by applying high voltage to the $V_{PP}$ pin. After erasing, the erase verify mode is used to check that all cells have been erased.

The command sequence is as follows:
1) Activate the following in User Control Register 1: CNWL, CYNBL, CWNBL, CIROWB, and CPDDIS. All other User Control Register 1 signals are deactivated.
2) Deactivate all User Control Register 2 signals.
3) Activate CHVPS in User Control Register 1.
4) Wait for erase to complete.
5) Deactivate CHVPS in User Control Register 1 and activate CLVPSB.
6) Activate CLVPSB in User Control Register 1.
7) Check Status Register to make sure VPS is not at high voltage.
8) Enable erase verify mode.
9) Return to step 1 if the array is not erased or go to step 10.
10) Enable the standby mode.

Erase Verify: A read operation that allows the user to verify that all cells have been erased. This mode is a read mode that uses an erase verify reference cell as the reference in the sense amplifiers. The erase verify reference cell can be trimmed in the same manner as the read reference cell.

The command sequence is as follows:
1) Activate the following User Control Register 1 signals: CESAMPB, CLVPSB, CDSTSEB, CREGATE, CIROWB, and ADDREG1. All other User Control Register 1 signals are deactivated.
2) Deactivate all User Control Register 2 signals.
3) Program ADDREG1 with address to be read.
4) Read data from PDBUS.
5) Repeat steps 3 and 4 until all addresses are exhausted and then proceed to step 6.
6) Enable standby mode.

Program: A 16-bit word write operation that selectively sets bits to a low logic level. It is initiated by the following command sequence and by the application of high voltage to the $V_{PP}$ pin:
1) Activate in User Control Register 1 signals CLVPSB and CIREF, and deactivate all other signals.
2) Program address in ADDREG1.
3) Program DATAREG with data to be programmed.
4) Additionally activate CEDIN in User Control Register 1.
5) Activate CPGM in User Control Register 2. All other User Control Register 2 signals deactivated.
6) Wait for write to complete.
7) Deactivate CPGM in User Control Register 2.
8) Check Status Register to make sure VPX and VPY are not at high voltage.
9) Deactivate CEDIN in User Control Register 1.
10) Repeat steps 2 through 9 as required and then proceed to step 11.
11) Enable Program Verify mode.

Program Verify: Verification by reading using the trimmable program verify reference cell as the reference in the sense amplifier. The reference cell is trimmed in the same manner as the read reference cell.

The command sequence is as follows:

1) Activate the following User Control Register 2 signals: CESAMPB, CLVPSB, CIROWB, ADDREG1, and CDSTSGB. Deactivate all other signals.
2) Activate the following User Control Register 2 signals: CREFPCEL, CPGATE, and CPGMVER7. Deactivate all other User Control Register 2 signals.
3) Program ADDREG1 with address to be read.
4) Read data from PDBUS.
5) Repeat steps 3 and 4 as necessary and then proceed to step 6.
6) Enable standby mode.

8. Classification Methods

The d-type classification chip has two basic classification modes: the restricted coulomb energy (RCE) method and the probability based RCE (PRCE) method.

Figure 27:
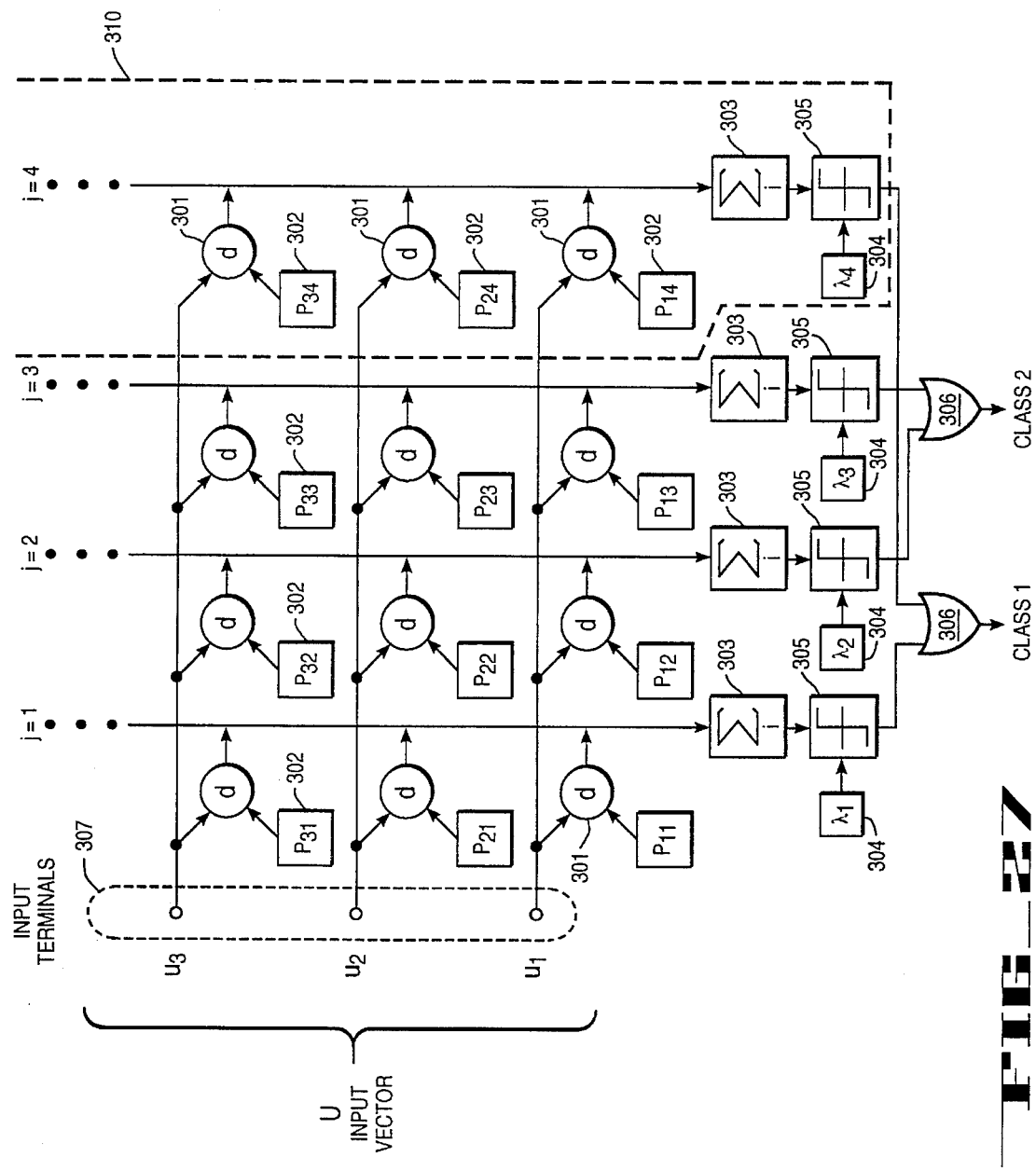
FIG. 27 is a functional block diagram of a restricted Coulomb energy (RCE) neural network classifier.

FIG. 27 is an example of an RCE based classifier network that could be implemented on the classification chip. An N-dimensional input vector, $U=[u_1, u_2, \ldots, u_i, \ldots u_N]$, applied to the input terminals 307. The distance processing array is laid out as a two-dimensional array with i being the row or input vector component index, and j being the neuron cell 310 index of the prototype layer. The neuron, at index i, j, calculates the elemental distance $|u_i - p_{ij}| = d_{ij}$ by means of distance calculating element 301. $P_{ij}$ is a prestored prototype component value corresponding to the $i^{th}$ element of the $j^{th}$ prototype vector and is stored in memory element 302. Element 303 is an accumulator for accumulating the sum of the elemental distances generated in the $j^{th}$ column to produce the distance $D_1(U, P_j)$ between the unknown input vector U and the $j^{th}$ prototype vector $P_j$, or $$D_1(U, P_j) = \sum_{i=1}^{N} |u_i - p_{ij}| \tag{12}$$

The output of accumulator 303 is compared with a radial threshold value, $\lambda_j$, stored in element 304, by forming the difference $\lambda_j - D_1(U, P_j)$ and applying the difference to a hard-limiting signum (sgn) function network 305 producing at the output the binary valued function, $$\text{sgn}\{\lambda_j - D_1(U, P_j)\} = \begin{cases} 1, & D_1(U, P_j) < \lambda_j \\ 0, & D_1(U, P_j) > \lambda_j \end{cases} \tag{21}$$

If the output of unit 305 is 1, then it is said to have fired.

Final classification is made by logically combining the binary outputs of a selected set of signum function networks 305 in a multi-input OR-gate 306 so that if any of the connected signum function networks fires, the output of the connected OR-gate 306 fires indicating that vector U is classified as belonging to the class represented by that particular OR-gate.

In order to have an unambiguous classification, it is necessary that only one network 305 be connected to a single OR-gate 306. However, this may not be sufficient to ensure any given input vector will only fire a single class output.

The training process should use an adequately representative set of input vectors to allow the best determination of the set of hyperspheroidal radial threshold value, $\{\lambda_j\}$, in conjunction with an appropriately prescribed cost function. However, training methods, per se, are not an object of the invention and hence will only be discussed to the extent necessary to describe the programmably flexible d-type neural network classifier chip.

FIG. 28 is a functional block diagram of a PRCE classifier that could be implemented by means of the d-type classifier chip.

The upper portion of FIG. 28 that includes summing units 303, memory elements 302, and distance calculating elements 301 which are the same as in FIG. 27 for the RCE classifier. The output of the $j^{th}$ column summer 303 is of the form $$D_1(U, P_j) = \sum_{i=1}^{N} d_{ij} = \sum_{i=1}^{N} |u_i - p_{ij}| = |U - P_j| \tag{22}$$

and corresponds to the distance between input vector U and the $j^{th}$ prototype vector, $P_j$.

The object of the PRCE classifier is to generate probability functions, using the method of Parzen-windows, from distance values generated at the output of summer units 303. Units 307 calculate the probabilities associated with each, $P_j$, in the form $$q(U, j, l) = C_l^j \Omega[k.|U - P_j|] \tag{23}$$

where $C_l^j$ is the apriori rate of occurrence of class l given the distance $|U - P_j|$; $\Omega[k.|U - P_j|]$ is a well behaved N-dimensional distribution function centered at $P_j$, where the coordinates of $P_j$ correspond to the N-vector elements $[p_{1j}, p_{2j}, \ldots, p_{Nj}]$; and k is a parameter that controls the width or spread of the distribution, $\Omega[.]$.

Because the distribution function, $\Omega[.]$, is generally unknown and difficult to determine empirically, it is necessary to assume a distribution. It has been determined that an exponential distribution leads to useful results so that $$q(U, j, l) = C_l^j \cdot e^{-k|U - P_j|} \tag{24}$$

which is shown graphically in FIG. 29. The values of $\{C_l^j\}$ are stored in memory units 308 of FIG. 28.

The output of units 307 are applied to cross-bar switch 309 that selectively couples members of the set $\{q(U, j, l)\}$ to the various summing units in classifier output network 308 to produce at the summer unit 312 outputs of unit 307 terms of the form $$p(l, U) = \sum_{j \in l} q(U, j, 1) = \sum_{j \in l} C_1^j \cdot e^{-k|U - P_j|} \tag{25}$$

The sum is over all values of j corresponding to vectors that are members of class 1.

A probability normalizing factor is also calculated, as shown by the lowest summer in unit 310 by summing all unit 307 outputs so that the sum, Q, is given by $$Q = \sum_{j=1}^{N} C_1^j \cdot e^{-k|u - p_j|} \tag{26}$$

The reciprocal value, $1/Q$, is applied as a multiplicative factor to each class output probability. The probability of class 1 given U then is of the form $$P(1|U) = \frac{1}{Q} \sum_{j \in l} q(U, j, 1) \tag{27}$$

Thus, for example, the probability of vector U being in class $1=1$ of FIG. 28 would take on the form $$P(1|U) = \frac{1}{Q} \cdot [q(U, 1, 1) + q(U, 4, 1)] \tag{28}$$

and is shown graphically in FIG. 30. The distribution for this example is an N=2 dimensional example where $U=[u_1\ u_2]^T$, $p_1=[p_{11}\ p_{21}]^T$, and $p_4=[p_{14}\ p_{24}]^T$.

The probability that vector U belongs to class l is given by the sum of the two distributions q (U, 1, 1) and q (U, 4, 1) at the coordinates $(u_1, u_2)$ that corresponds to the component values of input vector U.

9. Multiple Chip Operation

The d-type neural network classifier is designed to work efficiently when more than one chip is required to store the many prototypes of a complex (high N-dimensional) feature space. A personal computer or a high speed controller can be used as a system administrator (SA) to handle conflicts and communications when more than one classifier chip is required to handle classification task. The SA also can be used to control the flow of information into and out of the chips as wells as for configuration and operating mode control.

When in the training mode, the chip will automatically assign prototype elements until a single prototype element of 256 5-bit cells is available which then causes the CHIPFULL# pin to be asserted. This indicates to the SA that another chip must be enabled in the learning mode. This process of filling and enabling can continue until the system limit is reached which, in a single chip system, occurs when the first chip capacity of 1024 prototype vectors is reached. If the total capacity of the system is exceeded, the SA intervenes by producing an insufficient capacity indicator. The user may exercise one of several options: use the system as is for classification; use more chips; reorder the training set and restart the learning process; or present a more selective, reduced training set of prototype vectors.

If new prototypes are added during the learning phase to a pretrained classifier system, it is necessary that the new threshold ($\lambda$) associated with that vector be made equal to the distance between the new vector and its closest preexisting vector. This distance, $D_{min}$, is checked by each chip within the system and is sent to the SA. The SA selects the smallest $D_{min}$ and sets it equal to the global minimum value, $D_{minglobal}$, which is used as the initial $\lambda$ threshold value by the chip that accommodates the new prototype.

Because the normalization factor, Q, is determined by sum of the unnormalized probability distribution from each class, the Q's from all chips in a multiple chip system are summed by the SA to generate a global normalization factor, $Q_{global}$. The sum of the p (l, U) terms (equation 25) are then divided by $Q_{global}$ to produce normalized probabilities.

In the classification mode, the set of all class probabilities, [P (l, U) }, (up to 64 per chip) must be generated by the SA from the sum of all unnormalized p (l, U) terms from each chip before normalizing by $Q_{global}$. These unnormalized probabilities are obtained by the SA polling each chip by means of the chip select pin CS#, giving each chip individual access to the external bus.

10. Classifier Chip Mode Control

The modes of operation of the d-type classifier chip is controlled by writing command words to the chip's command and control registers in the I/O register set (see Section 6. Input/Output Unit). The following is a representative list of user defined commands which could be implemented by writing the appropriate utility programs for use by MC 17. These commands would be initiated by the SA writing a command word to one or more of the OP-0 through OP-5 general I/O operand registers (see Section 6. Input/Output Unit). The SA would then assert the MCINT# pin low forcing MC 17 into an interrupt service routine which would check the appropriate OP[0:5] for a new command. Thus, the following list of utilities is by way of example only and other utility programs will suggest themselves to those practicing the art.

WAIT: (Wait for new operation) puts chip on hold awaiting a new operation to be written into the chip command register. Signals required: D[0:63].

RESET: (Reset) enables the host to clear the input registers and reupload the parameters ($\lambda$'s, Cj's, etc.) to PPRAM from host memory. SA initiates the procedure by writing the command word to an OP register. After completing the reset procedures, the chip enters the WAIT state. Signals required: D[0:63], OE#, RDY#, EOP#, CE#, and TEND#.

LEARNBEGIN: (Begin learning input vectors) causes a complete initialization (including flash erase) after which a prototype vector is latched from the external data bus and stored as an initial prototype. The EOP# flag is asserted. Subsequent learning is done by means of LEARNRCE or LEARNEPOCH. Signals required: D[0:63], OE#, RDY#, EOP#, CE#, and TEND#.

LEARNRCE: (Incremental learning) is the normal learn mode which assumes initialization has occurred, at least one prototype is stored, and some training has been done. It is invoked by sending the opcode to the specified OP register by presenting an input training vector on the external data bus, writing the class associated with the input vector to a prescribed OP register. The input vector is compared with the stored prototypes. If no prototype class fires, the input data vector is stored in PA 13. The program then adjusts threshold ($\lambda$) values by a prescribed amount and updates the $C_j$ values stored in MURAM 26. Both RCE and PRCE are supported by command because while RCE calculations are in process, statistics are collected for PRCE.

LEARNPOCH: (Learn a new epoch) similar to LEARNBEGIN except that, instead of a complete initialization, only the apriori rates occurrence ($C_j$'s) are cleared. Use at the beginning of each iteration of the learning data set ensures correct $C_j$'s. After initialization, a new vector is compared as in LEARNRCE and LEARNBEGIN.

CLASSIFY: (Classification) normal classifying mode begins by clearing pertinent data registers and then waits for the initialization of an input data transfer. The chip signals that the input buffer is ready and awaits the SA enable command (see Section 6. Input/Output Unit). Input burst cycle continues until the prescribed vector length is reached. RCE processing proceeds, and if more than one class fires, the MULTICLASS# chip signal is asserted low. If only one class fires, RCE# is asserted instead. The class identification word is an 8-bit word with the lower 6 bits designating one of 64 classes, the $7^{th}$ bit signifying confidence in the classification, and the msb ($8^{th}$ bit) is a flag indicating lack of identification. If more than one class fires, the chip automatically proceeds to the PRCE classification mode. The following table summarizes the action required by the SA because of various conditions arising during classification.

| Case | Qualification | Action Taken |
| --- | --- | --- |
| 1 | 1 Class, 1 Chip | SA accepts single answer as valid. Stop at RCE analysis. |
| 2 | 1 Class, >1 Chip | SA polls chips for classes, accepts single answer as valid. Stop at RCE analysis. |
| 3a | >1 Class, 1 Chip (RCE_ONLY mode has been previously specified) | MULTICLASS# asserted. Stop at RCE analysis. SA accepts all firing classes and may attempt to determine dominant class with confidence level. (A winner may be found if $\lambda>\lambda_{min}$ for prototypes of one class only.) |
| 3b | >1 Class, 1 Chip | MULTICLASS# asserted. Chip continues into a PRCE classification mode (only if $\lambda>\lambda_{min}$ for prototypes of many classes or no classes), or stops (if $\lambda>\lambda_{min}$ for only 1 class). SA accepts probability densities (in the first case) or |

-continued

| Case | Qualification | Action Taken |
|---|---|---|
| 4a | >1 Class, >1 Chip (RCE_ONLY mode) | the winning class (in the second case). MULTICLASS# asserted. SA accepts firing classes from all chips. Voting and confidence level may be used to determine dominant class. |
| 4b | >1 Class, >1 Chip (Unnormalized probability densities) | MULTICLASS# asserted. Each chip calculates relative probabilities (only if $\lambda > \lambda_{min}$ for prototypes of many classes or no classes), or stops (if $\lambda > \lambda_{min}$ for only 1 class). The SA accepts these values sequentially from each chip. |
| 4c | >1 Class, >1 Chip (Normalized probabilities) | MULTICLASS# asserted. Each chip calculates relative probability densities for each of the 64 classes (only if $\lambda > \lambda_{min}$ for prototypes of many classes or no classes), or stops (if $\lambda > \lambda_{min}$ for only 1 class). If PRCE mode is entered, the SA polls each chip to release its relative probability densities, and these are gathered by the SA. After all chips have released their information, the SA has access to global P's for each class, and therefore also the normalizing factor Qglobal (by summing the Pglobals). |

RCEONLY: (RCE mode only) same as CLASSIFY except that it allows the SA to suppress the chip from entering the PRCE classification mode when multiple classes fire. It is initiated by means of the OP registers. It is used when speed of operation is preferred to unambiguous classification. Signals required: D[0:63], OE#, RDY#, EOP#, CE#, and TEND#.

SELFTEST: (Built-in self test) RAM flash memory is checked for accuracy and computing structures are checked with psuedorandum test patterns generated on-chip. A test seed may be implanted via the data bus. At the end of the test, EOP# is asserted and data terminals D[0:63] show test results. Signals required: D[0:63] and EOP#.

USERTEST: (External test) allows SA to run as the microcontroller (MP 17) by providing access to the internal buses. MP 17 resets all parts of the chip and then enters an internal wait state. All parts of the chip (except MP 17) are accessible via D[0:15] for the internal DBUS and via D[16:32] for the internal ABUS. Signals required: D[0:63] and EOP#.

INPTLOAD: (Load input buffer) prepares the chip to receive from 1 to 256 5-bit inputs. The SA initiates the transfer as in the CLASSIFY mode. Signals required: EOP#.

BACKUP: (Backup) copies computational constants (e.g., $\lambda$'s, $C_j$'s, etc.) stored in internal RAMs into the backup portion of host memory. Signals required: EOP#.

WEIGHTWRITE: (Weight write) used for copying the input registers, previously loaded by use of INPUTLOAD, to prototype memory (PPRAM). Prototype address is preloaded into OP-0. MC 17 performs a write to PPRAM and then enters a WAIT mode. Signals required: EOP# and A[0:9].

WEIGHTCLEAR: (weight clear) clears prototype in PPRAM specified by address supplied in the OP-0 register and then enters WAIT mode. Signals required: EOP# and A[0:9].

WEIGHTREAD: (Read weight) reads weights (component values) of the prototype specified by address placed in the OP-0 register, places contents in OP[1], and activates EOP# pin. Signals required: A[0:17], D[0:63], and EOP#.

RAMREAD: (Read RAM) allows SA to read constants stored in MURAM at the address stored in OP-0. Read data is placed in OP-0, 1, 2, 3 as follows:

| Register | Bits | Data Type (abbreviation) |
|---|---|---|
| OP-0 | [0:51] | Class Number (ID) |
| OP-0 | [6] | Confidence Value (CV) |
| OP-0 | [7] | Fire (F) |
| OP-0 | [8:15] | Smoothing Factor (k) |
| OP-1 | [0:15] | Lambda ($\lambda$) |
| OP-2 | [0:15] | Rte of Occurrence (Cj) |
| OP-3 | [0:15] | Distance (D) |

Signals required: A[0:9], D[0:63], and EOP#.

RAMWRITE: (Write RAM) allows Sa to write to variables stored in the internal RAM registers specified by the prototype address written into OP-0 and the data supplied in OP-1, 2, 3, 4, and 5. Signals required: A[0:9] and D[0:63].

11. External Bus Protocol

The following bus protocol is used for data transfers into and out of the chip when operating in the NORMAL read and write modes, PGFREAD, PGFLOAD, and PGFTEST modes. (Note that this protocol is not used in the TEST mode which is entered by asserting CS# and TEST# pins low and MC# pin high.) The protocol supports transfers of single and burst (or multiple bus widths of data) transfers in a single bus cycle. A single bus cycle is a single transaction on the external bus.

The following signals (pins) are used to control an external bus cycle.

Address Strobe (ADS#): When sampled low by MC 17, a bus cycle is initiated one clock later. Pins A[0:15] provide relevant internal addresses.

Nonburst Ready (RDY#): Output pin, when sampled high by the SA, indicates that data on pins D[0:63] is valid or that the data on D[0:63] has been accepted. No more data is to be transferred in the current bus cycle.

Burst Ready (BRDY#): When the SA samples this pin low, data on D[0:63] is valid or accepted, and more data may be transferred in the current burst cycle.

Bus Error (BERR#): This indicates a request for an unsupported bus cycle mode by the SA. The BERR# pin is asserted low and the current bus cycle terminates.

Burst Last (BLAST#): When sampled low by the chips, this indicates that the current data word being transferred is the last in this bus cycle. (note that BRDY# or RDY# must be sampled low at the same time as BLAST#.) The bus cycle terminates.

Chip Select (CS#): When sampled low, one clock after ADS# is sampled low. This indicates that the chip is being addressed in the current bus cycle.

Write/Read (W/R#): When sampled high, one clock after ADS# is sampled low. This indicates the start of a write cycle. If W/R# is sampled low, the current bus cycle is a read cycle transferring data out of the chip.

Address Pins (A[0:15]): SA supplied addresses, sampled one clock after ADS# is sampled low. Only valid addresses are for I/O registers, IRAM, and ORAM. If MC# pin is low, the chip is in an MC mode and the address pins point to PGFLASH.

FIG. 31 is a timing diagram illustrating examples of bus transactions. The protocol illustrated applies to both NOR- MAL mode and MC mode input cycles to the chip. The following table lists the times at which the associated action or condition occurs.

| Time | Action/Condition |
|---|---|
| T1: | SA asserts ADS# low to start the bus cycle. |
| T2: | Bus definition pins are sampled: W/R# high, CS# low, BLAST# low, and the address points A[0:15] are set to the desired address. |
| T3: | Chip is not ready. RDY# and BRDY# are high. |
| T4: | RDY# is asserted low, terminating the bus cycle because BLAST# is also low. |
| T5: | ADS# is low, starting a new bus cycle. |
| T6: | BLAST# is high, indicating a burst transfer. to address A[0:15]. |
| T7: | Chip asserts BRDY# low and accepts data word D0. |
| T8: | Chip accepts data word D1. |
| T9: | Chip accepts data word D2. |
| T10: | Chip asserts RDY# low and accepts the last data word, D3. |
| T11: | ADS# low starts a new bus cycle. |
| T13: | Chip accepts first data word, D0. |
| T14: | SA terminates burst cycle by asserting pin BLAST# low. |
| T15: | ADS# starts a new bus cycle. |
| T16: | Bus cycle is defined, but address A3 is assumed to be illegal. |
| T17: | Chip returns BERR# low, indicating an illegal bus operation. |

FIG. 32 illustrates several data read bus cycles (chip output cycles) as described below.

| Time | Action/Condition |
|---|---|
| T1: | SA starts bus cycle by asserting ADS#. |
| T2: | Bus definition pins are sampled W/R# low, CS# low, BLAST# low, and the address is set to A0. |
| T3: | Chip is not ready. RDY# and BRDY# are both high; data is invalid. |
| T4: | Chip signals valid dat6a by asserting RDY# low. The cycle is terminated because BLAST# is also low. |
| T5: | New bus cycle with ADS# low. |
| T6: | Address is sampled and BLAST# is high indicating a burst transfer. |
| T7: | Chip asserts BRDY# low, validating the first data word, D0. |
| T8: | Chip signals D1 is valid. |
| T9: | Chip signals D2 is valid. |
| T10: | Chip signals D3 is valid and indicates D3 to be the last word by asserting RDY# low. |
| T11: | New bus cycle with ADS# low. |
| T13: | Chip signals D0 valid. |
| T14: | SA terminates burst cycle by asserting BLAST# low. |
| T15: | New bus cycle with ADS# low. |
| T16: | Bus cycle is defined, but assume address A3 is assumed is illegal. |
| T17: | Chip returns BERR# low, indicating an illegal bus operation. |

Note that in the PGFTEST mode, the above protocol is used. However, the upper 32 data pins D[32:63] are connected to the internal TBUS while D[0:15] are used as in normal or MC mode data transfer.

TEST mode is entered by asserting pins CS# and TEST# low and MC# high. This allows the SA to supplant the role of MC 17 in the chip's internal DBUS and ABUS system. Consequently, the bus protocol used on the outside pins is changed to conform to the internal DBUS and ABUS protocols.

In the TEST mode, data pins D[0:63] are repartitioned as follows:

| Pins | Assignment |
|---|---|
| D[0:15] | DBUS input/output pins as determined by the W/R# pin. |
| D[16:23] | CBUS outputs. |
| D[24:31] | CBUS inputs (D[28]) is the DBUS precharge signal. |
| D[31:63] | Direct connection to TBUS. |

W/R# controls the direction of data transfer. Also, in the TEST mode, signal pins are not synchronously sampled so that changes at input pins are propagated immediately to the chip internals.

The chip has three interrupt/error mechanisms for use in the normal mode only: service request to the SA, MC 17 interrupt from the SA, and an error pin for indicating general errors.

Service Request (SRQ#): When asserted low, this indicates that the chip requires service as identified by the contents of the XIR register in the I/O registers. If the contents of XIR is FF (hexadecimal), this indicates that the output-results-buffer is full. MC 17 holds SRQ# low until the service request is acknowledged by the SA by writing hexadecimal value FFFF in XIR. SRQ# is asserted by MC 17 by writing a data word in I/O register XIR or by setting bit 2 of register CRA high indicating ORAM is full.

Microcontroller Interrupt (MCINT#): This interrupts MC 17 when bit 0 of I/O register IIR is set to 1 and held for two clock cycles and remains asserted until MC 17 acknowledges it.

Error Pin (ERROR#): Both input and output pins that may be pulled low by the SA signaling an interrupt to MC 17, or MC 17 may pull it low when the MC 17 software sets the MC 17 general error flag.

What is claimed is:

1. A distance calculating neural network classifier integrated circuit chip comprising:

a. an input buffer for receiving and buffering an unknown input data vector with N elements at an input port of the input buffer, and an output port for sequentially outputting the vector elements;

b. a prototype memory array for storing a multiplicity of M prescribed prototype vectors, each prototype vector having N elements, and having M output ports for sequentially outputting the elements of each prototype vector in parallel;

c. a distance calculating unit having a multiplicity of parallel distance processing units, each processing unit having a first and a second input, the first input of each connected to the output port of the input buffer, the second input of each connected to a prescribed output port of the prototype memory array for sequentially calculating a distance metric representative of a vector distance between the unknown input data vector and each of the M prescribed prototype vectors, and the distance calculating unit having an output port for outputting the calculated distance metrics;

d. a prototype parameter memory for storing a prescribed set of M prototype vector distance classification parameters, one for each of the M prototype vectors, and an output port for reading out the stored classifications;

e. a mathematical processing unit having a first input port connected to the output port of the distance calculating unit, a second input port connected to the output port of the prototype parameter memory, for comparing the M calculated distance metrics with each of the M prototype vector distance classification parameters, and for producing a firing indicator associated with each of the M prototype vector distance classification parameters after each comparison that shows the distance metric to be less than the prototype vector distance classification parameter; and f. a microcontroller having a program memory for storing a prescribed classification program and having a control bus for distributing control signals throughout the chip, so that the classifier integrated circuit chip operates in accordance with the prescribed classification program.

2. The classifier integrated circuit chip of claim 1 wherein the distance calculating unit has a multiplicity of M/2 parallel distance processing unit for computing M/2 distance metrics in parallel and the mathematical processing unit further comprises an input buffer with a first and second buffer, the first buffer for buffering a first set of M/2 distance metrics while a second set of M/2 distance metrics are computed by the distance calculating unit, a first buffer contents being available for processing by the mathematical processing unit while the second buffer is accumulating the second set of M/2 distance metrics thereby providing for pipelined processing in the distance calculating unit and the mathematical processing unit.

3. The classifier integrated circuit chip of claim 2 wherein the mathematical processing unit further comprises means for categorizing prototype vectors into subsets representative of different classes so that if any prototype vector produces a firing indicator, an associated class identifier is produced that associates the firing indicator with a class.

4. The classifier integrated circuit chip of claim 3 wherein the mathematical processing unit further comprises means for computing a class probability representing the probability that the unknown input data vector belongs to a given class.

5. The classifier integrated circuitry chip of claim 4 wherein a class probability density functions are a sum of exponential functions of the distance metrics belonging to a given class.

6. The classifier integrated circuit chip of claim 5 wherein the class probability density functions are calculated from a sum of products of an apriori probability related parameter representing a frequency of occurrence of a given prototype vector and the probability of a particular class being true when the given prototype vector is present.

7. The classifier integrated circuit chip of claim 6 wherein the exponential functions are computed in a pipeline processor comprising the following pipeline stages:

a. a first pipeline stage that accepts a distance metric from the input buffer and an exponential decay parameter from the prototype parameter memory comprising:
i. a multiplier for multiplying the distance metric and the exponential decay parameter to form an exponential function argument, and represented by a string of bits having an integer field and fraction field separated by a binary decimal point;

b. a second pipeline stage comprising:
i. reduction logic means for extracting the fraction field of bits from the exponential function argument produced by the multiplier;
ii. a read-only memory look-up table for converting the fraction field to a binary decaying exponential value by using the fraction field as a table look-up address; and c. a third pipeline stage comprising a shift register for accepting the binary decaying exponential value from the read-only memory and right shifting the binary decaying exponential value by a number of bit-places designated by the binary value of the integer field.

8. The classifier integrated circuit chip of claim 7, the pipeline processor further comprises:

a. in the second pipeline stage,
i. logic means for splitting the fraction field into a most significant truncated field and a less significant residual field of bits not included in the truncated field and using the truncated fraction field for addressing a reduced size read-only memory;
ii. arithmetic means for computing a polynomial correction factor corresponding to a power series expansion of the binary decaying exponential value of the residual field; and b. in the third pipeline stage, arithmetic means for forming the product of the read-only memory binary exponential value and the binary decaying exponential value of the residual field thereby producing a value approximating the binary decaying exponential value of the fraction field.

9. The classifier integrated circuit chip of claim 7 wherein the third pipeline stage comprises means for receiving the binary decaying exponential value from the read-only memory and combining the binary decaying exponential value with the integer field into a floating point format.

10. The classifier integrated circuit chip of claim 7 wherein the pipeline processor further comprises a fourth pipeline stage wherein a multiplier forms the product of a binary prototype exponential value obtained from the third pipeline stage and a value obtained from the prototype parameter memory corresponding to an apriori frequency of occurrence of the prototype vector to form a Bayesian class probability.

11. The classifier integrated circuit chip of claim 10 further comprising a fifth pipeline stage wherein the Bayesian class probabilities belonging to a given class are accumulated to form a total cumulative class probability.

12. The classifier integrated circuit chip of claim 7 wherein the first pipeline stage further comprises means for comparing the distance metric with a corresponding distance classification parameter and incrementing a class count each time a prototype vector distance from the input vector distance is less than the distance classification parameter for that class, the class count representing the number of times a class has fired for a given input vector.

13. The classifier integrated circuit chip of claim 4 wherein the mathematical processing unit provides means for convening the class probability to IEEE standard 32-bit format.

14. A distance calculating neural network classification system comprising:

a. an external bus for data, address, control, and functionally interconnecting classification system elements;

b. at least two distance calculating neural network integrated circuit classifier chips, each chip having
i) an input buffer for receiving and buffering an unknown input data vector with N elements at an input port of the input buffer, and an output port for sequentially outputting the vector elements,
ii) a prototype memory array for storing a multiplicity of M prescribed prototype vectors each prototype vector having N elements, and having M output ports for sequentially outputting the elements of each prototype vector in parallel,
iii) a distance calculating unit having a multiplicity of parallel distance processing units, each processing unit having a first and a second input, the first input of each connected to the output port of the input buffer, the second input of each connected to a prescribed output port of the prototype memory array for sequentially calculating a distance metric representative of a vector distance between the unknown input data vector and each of the M prescribed prototype vectors, and the distance calculating unit having an output port for outputting the calculated distance metrics, iv) a prototype parameter memory for storing a prescribed set of M prototype vector distance classification parameters, one for each of the M prototype vectors, and an output port for reading out the stored classifications, v) a mathematical processing unit having a first input port connected to the output port of the distance calculating unit, a second input port connected to the output port of the prototype parameter memory, for comparing the M calculated distance metrics with each of the M prototype vector distance classification parameters, and for producing a firing indicator associated with each of the M prototype vector distance classification parameters after each comparison that shows the distance metric to be less than the prototype vector distance classification parameter, vi) a microcontroller having a program memory for storing a prescribed classification program and having a control bus for distributing control signals throughout the chips, so that the classifier integrated circuit chip operates in accordance with he prescribed classification program, and vii) a chip select pin which, when active, allows data transfers to and from the external bus; and c. a system administrator (SA) coupled to the classifier chips by the external bus for operating control and transfer of address and data to and from the distance calculating classifier chips by selectively activating the chip select pin of a classifier chip for down loading programs, for configuration control, for combining classification results when operating in a classification mode, and when in a learning mode, for assignment of a prototype vector to an individual chip, for applying a training vector, for combining all responses to the training vector, for adjusting prototype distance firing parameters in accordance with a prescribed training program, and for computing global probabilities based on all responses to the training vector.

15. The classification system of claim 14 wherein the SA detects when a classifier chip's prototype memory is full and automatically enables another chip if available, and if not available, asserts an indicator which indicates insufficient chip capacity to store additional prototypes.

16. The classification system of claim 14 when operating in the learning mode further comprises means receiving a new prototype vector as an incremental addition to a trained classification system, the SA initializes a new prototype distance firing parameter to be equal to the vector distance between the new prototype vector and its closest previously stored prototype vector.

17. A distance calculating neural network integrated circuit chip comprising:

(a.) an input buffer for receiving and buffering an unknown input data vector with N elements at an input port of the input buffer, and an output port for sequentially outputting the vector elements;

(b.) a prototype memory array for storing a multiplicity of M prescribed prototype vectors, each prototype vector having N elements, and having M output ports for sequentially outputting the elements of each prototype vector in parallel;

(c.) a distance calculating unit having a multiplicity of parallel distance processing units, each processing unit having a first and a second input, the first input of each connected to the output port of the input buffer, the second input of each connected to a prescribed output port of the prototype memory array for sequentially calculating a distance metric representative of a vector distance between the unknown input data vector and each of the M prescribed prototype vectors, and the distance calculating unit having an output port for outputting the calculated distance metrics;

(d.) a prototype parameter memory for storing a prescribed set of M prototype vector distance classification parameters, one for each of the M prototype vectors, and an output port for reading out the stored classifications;

(e.) a mathematical processing unit having a first input port connected to the output port of the distance calculating unit, a second input port connected to the output port of the prototype parameter memory, for comparing the M calculated distance metrics with each of the M prototype vector distance classification parameters, and for producing a firing indicator associated with each of the M prototype vector distance classification parameters after each comparison that shows the distance metric to be less than the prototype vector distance classification parameter; and (f.) a control bus for distributing control signals from an external controller throughout the integrated circuit chip.

18. The distance calculating neural network integrated circuit chip of claim 17 wherein the distance calculating unit has a multiplicity of M/2 parallel distance processing unit for computing M/2 distance metrics in parallel and the mathematical processing unit further comprises an input buffer with a first and second buffer, the first buffer for buffering a first set of M/2 distance metrics while a second set of M/2 distance metrics are computed by the distance calculating unit, a first buffer contents being available for processing by the mathematical processing unit while the second buffer is accumulating the second set of M/2 distance metrics thereby providing for pipelined processing in the distance calculating unit and the mathematical processing unit.

19. The distance calculating neural network integrated circuit chip of claim 18 wherein the mathematical processing unit further comprises means for categorizing prototype vectors into subsets representative of different classes so that if any prototype vector produces a firing indicator, an associated class identifier is produced that associates the firing indicator with a class.

20. The distance calculating neural network integrated circuit chip of claim 19 wherein the mathematical processing unit further comprises means for computing a class probability representing the probability that the unknown input data vector belongs to a given class.

21. The distance calculating neural network integrated circuitry chip of claim 20 wherein a class probability density functions are a sum of exponential functions of the distance metrics belonging to a given class.

22. The distance calculating neural network integrated circuit chip of claim 21 wherein the class probability density functions are calculated from a sum or products of an a priori probability related parameter representing a frequency of occurrence of a given prototype vector and the probability of a particular class being true when the given prototype vector is present.

23. The distance calculating neural network integrated circuit chip of claim 22 wherein the exponential functions are computed in a pipeline processor comprising the following pipeline states:
   (a) a first pipeline stage that accepts a distance metric from the input buffer and an exponential decay parameter from the prototype parameter memory comprising:
      (i) a multiplier for multiplying the distance metric and the exponential decay parameter to form an exponential function argument, and represented by a string of bits having an integer field and fraction field separated by a binary decimal point;
   (b) a second pipeline stage comprising:
      (i) reduction logic means for extracting the fraction field of bits from the exponential function argument produced by the multiplier;
      (ii) a read-only memory look-up table for converting the fraction field to a binary decaying exponential value by using the fraction field as a table look-up address; and
   (c) a third pipeline stage comprising a shift register for accepting the binary decaying exponential value from the read-only memory and right shifting the binary value by a number of bit-places designated by the binary value of the integer field.

24. The distance calculating neural network integrated circuit chip of claim 23, the pipeline processor further comprises:
   (a) in the second pipeline stage,
      (i) logic means splitting the fraction field into a most significant truncated field and a less significant residual field of bits not included in the truncated field and using the truncated fraction field for addressing a reduced size read-only memory;
      (ii) arithmetic means for computing a polynomial correction factor corresponding to a power series expansion of the binary decaying exponential value of the residual field; and
   (b) in the third pipeline stage, arithmetic means for forming the product of the read-only memory binary exponential value and the binary decaying exponential value of the residual field thereby producing a value approximating the binary decaying exponential value of the fraction field.

25. The distance calculating neural network integrated circuit chip of claim 23 wherein the third pipeline stage comprises means for receiving the binary decaying exponential value from the read-only memory and combining the binary decaying exponential value with the integer field into a floating point format.

26. The distance calculating neural network integrated circuit chip of claim 23 wherein the pipeline processor further comprises a fourth pipeline stage wherein a multiplier forms the product of a binary prototype exponential value obtained from the third pipeline stage and a value obtained from the prototype parameter memory corresponding to an a priori frequency of occurrence of the prototype vector to form a Bayesian class probability.

27. The distance calculating neural network integrated circuit chip of claim 26 further comprising a fifth pipeline stage wherein the Bayesian class probabilities belonging to a given class are accumulated to form a total cumulative class probability.

28. The distance calculating neural network integrated circuit chip of claim 23 wherein the first pipeline stage further comprises means for comparing the distance metric with a corresponding distance classification parameter and incrementing a class count each time a prototype vector distance from the input vector distance is less than the distance classification parameter for that class, the class count representing the number of times a class has fired for a given input vector.

29. A distance calculating neural network integrated circuit chip of claim 20 wherein the mathematical processing unit provides means for converting the class probability to IEEE standard 32-bit format.

* * * * *

UNITED STATES PATENT AND TRADEMARK OFFICE
CERTIFICATE OF CORRECTION

PATENT NO. : 5,487,133
DATED : January 23, 996
INVENTOR(S) : Park et al.

It is certified that error appears in the above-identified patent and that said Letters Patent is hereby corrected as shown below:

In column 2 at line 2 delete "signurn" and insert --signum--

In column 2 at line 8 delete "pans" and insert --parts--

In column 6 at line 65 delete "packaged is" and insert --packaged in--

In column 8 at line 42 delete "pin.?" and insert --pin.--

In column 21 at line 64 insert --188-- following "(MUX)" and prior to "is"

In column 30 at line 9 delete "[0:51]" and insert --[0:5]--

In column 34 at line 49 delete "convening" and insert --converting--

Signed and Sealed this

Fourth Day of February, 1997

Attest:

BRUCE LEHMAN

Attesting Officer

Commissioner of Patents and Trademarks